United States Patent [19]
Aoki et al.

[11] Patent Number: 5,550,562
[45] Date of Patent: Aug. 27, 1996

[54] DATA PROCESSING DEVICE THAT ENABLES MOUSE-OPERATED APPLICATION PROGRAMS TO BE OPERATED FROM AN OPERATION PAD, AND AN OPERATION PAD FOR USE WITH THE SAME

[75] Inventors: Yoichi Aoki; Yasuo Sato; Chiaki Ito; Hitoshi Nishiuchi; Makoto Nakamoto; Syoji Yamaguchi; Haruhiko Mio; Kazuhiro Koyata, all of Kawasaki; Yoshinori Miyazawa, Inagi, all of Japan

[73] Assignee: Fujitsu Limited, Kawasaki, Japan

[21] Appl. No.: 420,707

[22] Filed: Apr. 11, 1995

Related U.S. Application Data

[63] Continuation-in-part of Ser. No. 113,809, Aug. 31, 1993, abandoned.

[30] Foreign Application Priority Data

Jan. 12, 1993 [JP] Japan ................................ 5-003494
Jan. 12, 1993 [JP] Japan ................................ 5-003495

[51] Int. Cl.$^6$ .................................................. G09G 3/02
[52] U.S. Cl. .......................... 345/163; 345/168; 345/161
[58] Field of Search .................................. 345/157, 156, 345/160, 161, 163, 167, 168, 169, 173

[56] References Cited

U.S. PATENT DOCUMENTS

| | | | |
|---|---|---|---|
| 4,527,250 | 7/1985 | Galdun et al. | 345/168 |
| 4,779,079 | 10/1988 | Hauck | 345/156 |
| 4,917,516 | 4/1990 | Retter | 345/163 |
| 5,148,155 | 9/1992 | Martin et al. | 345/175 |
| 5,198,802 | 3/1993 | Bertram et al. | 345/165 |
| 5,305,449 | 4/1994 | Ulenas | 345/163 |

OTHER PUBLICATIONS

"Keyboard/Mouse Adapter" T. Maruyamia, S. Naitoh and T. Yanagi IBM Technical Disclosure Bulletin vol. 27 No. 5 Oct. 1984.

*Primary Examiner*—Jeffery Brier
*Assistant Examiner*—Doon Chow
*Attorney, Agent, or Firm*—Staas & Halsey

[57] ABSTRACT

A data processing device includes an emulation processing section for performing prescribed processing on an output signal of an operation pad for conversion into a signal or data which is equivalent to a signal or data that would be obtained when operating a mouse to generate information. The operation pad is then usable with an application program that is designed for use only with signals output from the mouse.

5 Claims, 15 Drawing Sheets

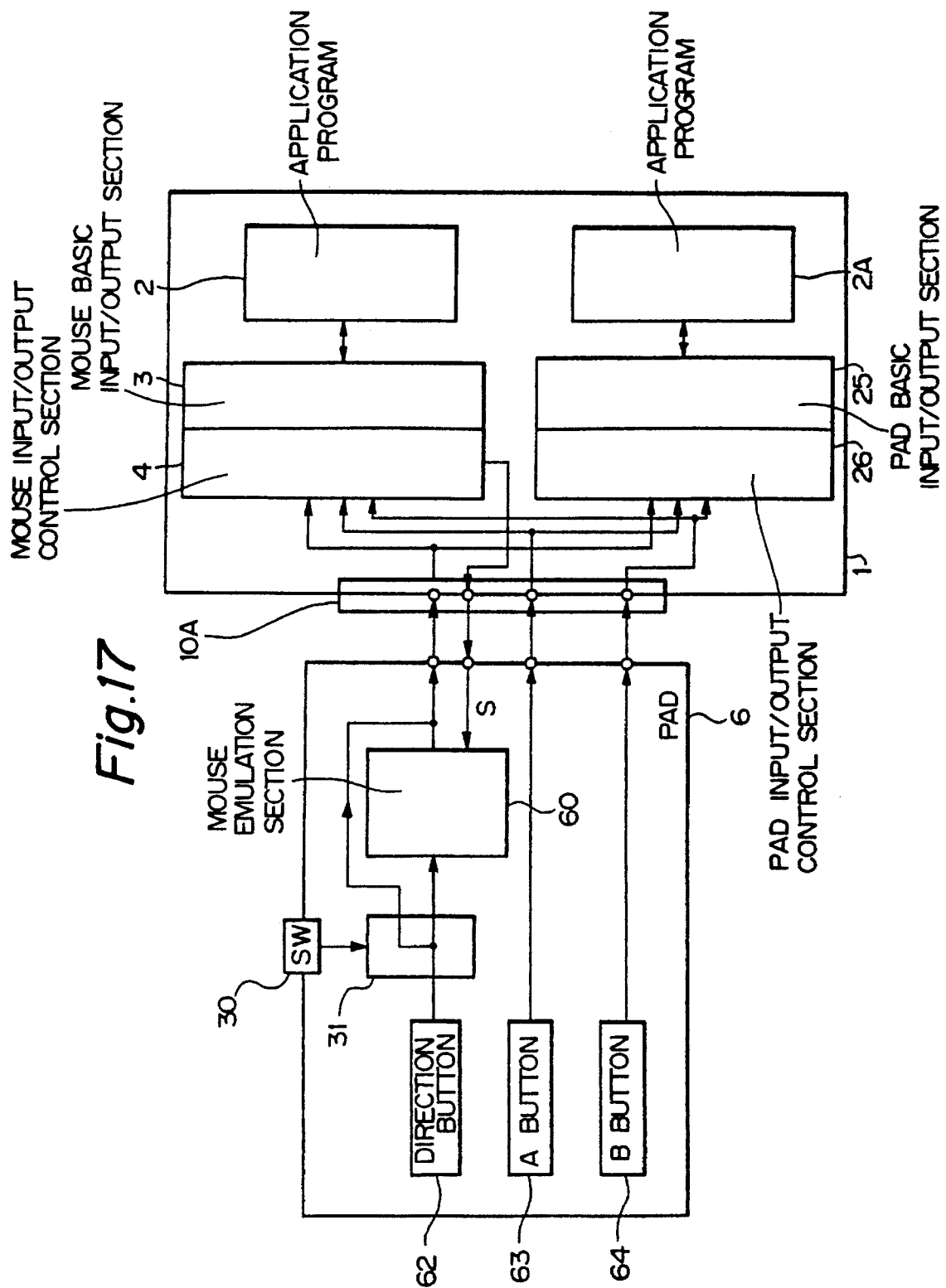

DATA PROCESSING DEVICE THAT ENABLES MOUSE-OPERATED APPLICATION PROGRAMS TO BE OPERATED FROM AN OPERATION PAD, AND AN OPERATION PAD FOR USE WITH THE SAME

This application is a continuation of application Ser. No. 08/113,809, filed Aug. 31, 1993, now abandoned.

BACKGROUND OF THE INVENTION

1. Field of the Invention

The present invention relates to a data processing device and an operation pad for use with the same. More particularly, the invention relates to a data processing device that performs emulation based on output signals of an operation pad to enable application programs designed for operation with a mouse to be operated through the operation pad, and also relates to the operation pad for use with such a data processing device.

Personal computers, home video game machines, and the like, are now coming into widespread use in ordinary homes. These products are called home information appliances, which form a field where a large future market is expected. The key to widespread use lies in the ease of operation and the price (including the input devices used).

2. Description of the Related Art

Personal computers have attained remarkable improvements in cost effectiveness and have been finding an extremely wide range of applications. A great many software programs are now available to support the wide range of applications. Such software programs are supplied, for example, in the form of a CD-ROM.

The use of a mouse as a type of input device for personal computers has become quite common. Many software programs (application programs) currently available assume the use of a mouse as an input device and are designed accordingly. The mouse is connected via a special mouse interface to a computer that contains application programs, etc.

On the other hand, home video game machines have achieved low cost and widespread use by restricting their application to outputting a screen to a television receiver and playing games on the screen.

Almost all home video game machines use a device called an operation pad (or a joystick) as the input device. Like the mouse, the operation pad is a position input device, but unlike the mouse, the operation pad does not use a rotating ball, but uses a lever (and a button or buttons) for operation, which simplifies the mechanism and thus achieves low cost. The operation pad is hereinafter referred to simply as the pad.

In a home video game machine, the pad is connected via a special pad interface to the machine which also contains application programs.

The mouse interface is also capable of connecting a trackball. The trackball has much in common with the mouse in that both utilize the rotation of a ball, and is therefore compatible with the mouse.

Like the trackball, the mouse is used to enter position information by rotating the ball set under its case and inputting the direction and distance of the ball's movement. More specifically, the mouse needs to be moved around on a desk surface or the like to rotate the ball, which inevitably necessitates the provision of a desk or like surface and hence an installation space for such a desk or the like. Furthermore, the mouse has the problem that it is expensive because of its complex mechanism.

On the other hand, the pad does not require a desk or like surface to operate, and also, is inexpensive in construction.

If the pad is used instead of the mouse as the input device, it not only obviates the need for a desk or similar space, but can also achieve a reduction in cost. In particular, for those who already have a home video game machine, it is not necessary to purchase a mouse as an input device to use with a personal computer.

As previously stated, however, many application programs for personal computers assume the use of a mouse as an input device. Using such software, therefore, requires the input or connection to be made via the mouse interface.

However, a pad cannot be connected to the mouse interface. That is, the pad does not have compatibility with the mouse. The problem here is that those software programs that assume the use of a mouse as an input device cannot be used or operated with a pad.

SUMMARY OF THE INVENTION

It is an object of the invention to provide a data processing device that enables software designed for operation by mouse input to be operated through a pad, and a pad for use with such a data processing device.

The data processing device of the invention includes an emulation processing section that performs prescribed processing on an output signal of an operation pad to convert the signal to operating data for use on an application program designed for operation with a mouse. This permits the use of an operation pad in place of a mouse in order to input data on an application program designed for operation with a mouse.

According to a first mode of the invention, the emulation processing section is contained in the main unit. According to a second mode of the invention, it is contained in the operation pad.

BRIEF DESCRIPTION OF THE DRAWINGS

The present invention will be more clearly understood from the description as set forth below with reference to the accompanying drawings, wherein:

FIG. 17 is a block diagram showing the configuration of a data processing device according to a ninth embodiment of the invention.

DESCRIPTION OF THE PREFERRED EMBODIMENTS

Figure 1:
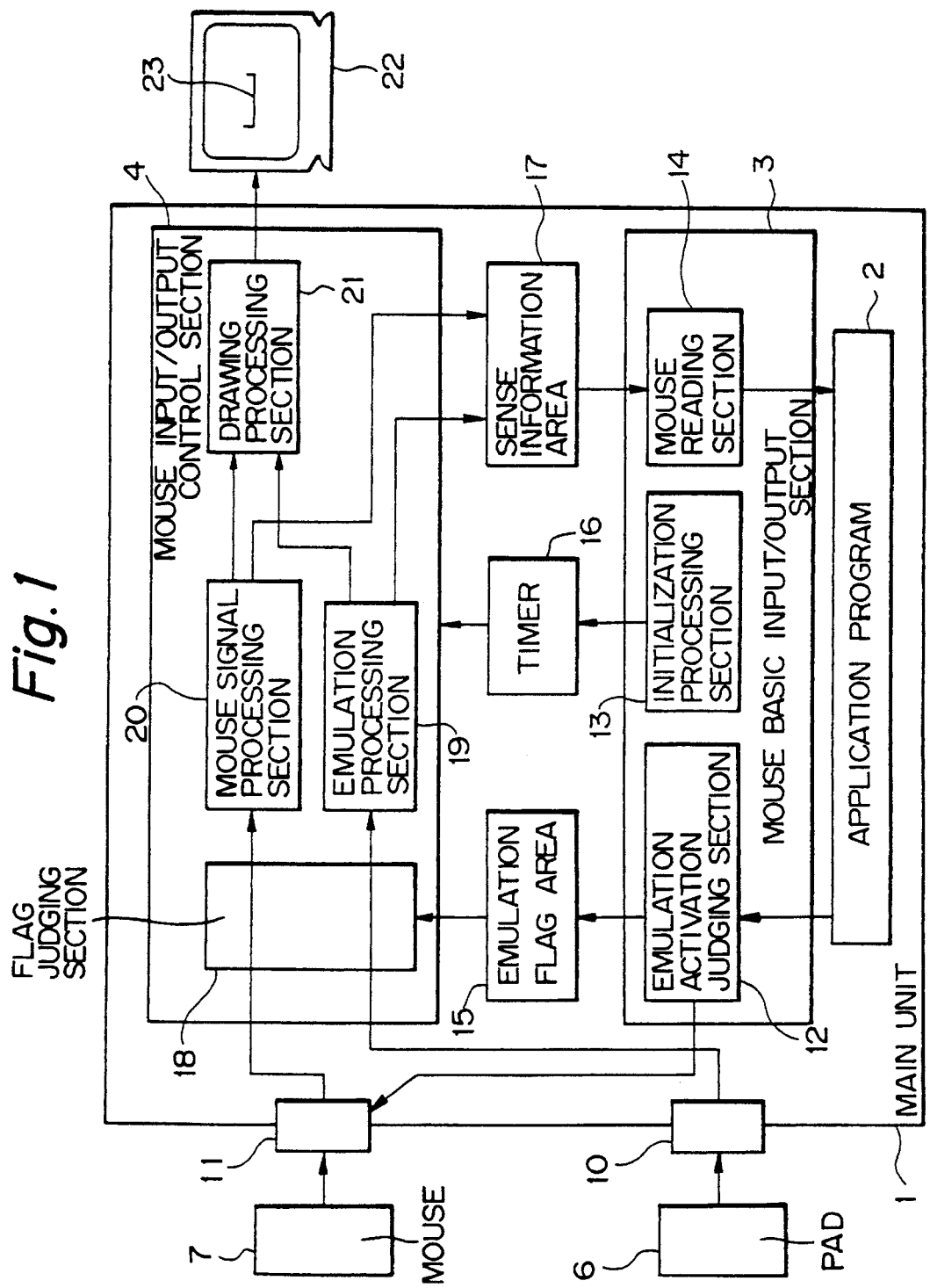
FIG. 1 is a block diagram showing the configuration of a data processing device according to a first embodiment of the invention.

FIG. 1 is a diagram showing the configuration of a data processing device according to a first embodiment. The first embodiment is concerned with an example in which a mouse emulation section, for processing an output signal of a pad by emulation into a corresponding output signal of a mouse, is contained in the main unit.

The main unit 1 is a personal computer or a home video game machine main unit, and comprises a central processing unit (CPU), memory, etc.

The main unit 1 is housed in a cabinet and connected to a display device 22. The display device 22 comprises, for example, a cathode-ray tube, a liquid-crystal display, or the like. The display device 22 may be built integrally with the cabinet of the main unit 1, or alternatively, a home television receiver may be used as the display device 22. Displayed on the display device 22 is a mouse cursor 23 whose position information is input by means of a mouse 7.

The main unit 1 is fitted with a connector 10 to which a connector from a pad 6 is fastened and a connector 11 to which a connector from the mouse 7 is fastened. An application program 2 is designed for operation through input from the mouse 7, so that normally the mouse 7 is connected to the connector 11. An output signal from the mouse 7 is relayed to input the position information of the mouse cursor 23 to the application program 2. At the same time, the mouse cursor 23 is displayed at the designated location on the display device 22.

The mouse 7 is a known hand-held input device used to input position information by being moved around on a flat surface and thereby rotating the ball set under its case. In this specification, the term "mouse 7" may be considered as including a trackball which is compatible with the mouse 7. The configuration of the mouse 7 will be described later.

The pad 6 is a known hand-held input device for home video game machines, which unlike the mouse 7, does not use a ball but has a lever or buttons operated to input position information. In this specification, the pad 6 refers to an input device which has either buttons that direct movements in at least two different directions (X or horizontal direction and Y or vertical direction), or a lever that is free to move in at least two different directions. The term "pad 6" may be considered as including a joystick. The configuration of the pad 6 will be described later.

The application program 2 is a program that resides in memory of the main unit 1, and has an interface specifically designed for mouse input from the mouse 7.

The application program 2 is supplied, for example, in the form of a CD-ROM. A CD-ROM drive is built in integral fashion, for example, into the cabinet of the main unit 1.

A mouse basic input/output section 3 is implemented in the form of a program residing in memory of the main unit 1, constitutes a part of a basic input/output system, and is responsible, in particular, for the control of the mouse 7.

A mouse input/output control section 4 is also implemented in the form of a program residing in memory of the main unit 1, constitutes a part of an input/output system, and is responsible, in particular, for the management of the mouse 7.

An emulation processing section 19 is contained in the mouse input/output control section 4, as shown in FIG. 1. That is, this section is also implemented in the form of a program residing in memory of the main unit 1.

Along with the emulation processing section 19, a flag judging section 18 is provided in the mouse input/output control section 4, while an emulation activation judging section 12 is included in the mouse basic input/output section 3. An emulation flag area 15 is provided separately. These sections together may be considered as constituting a section for emulating mouse output signals.

The mouse basic input/output section 3 comprises of the emulation activation judging section 12, an initialization processing section 13, and a mouse reading section 14.

The emulation activation judging section 12, together with the initialization processing section 13, forms an initialization routine for the mouse basic input/output section 3. When this initialization routine is called from the application program 2, the emulation activation judging section 12 judges whether the emulation by the emulation processing section 19 is necessary, that is, whether the emulation processing section 19 is to be activated or not.

To achieve this purpose, the emulation activation judging section 12 monitors the connector 11 for the connection of the mouse 7. More specifically, the emulation activation judging section 12 has a means for physically detecting the connection of the mouse 7 when its connector is connected to the connector 11.

If the mouse 7 is not connected to the connector 11, then the emulation activation judging section 12 determines that the pad 6 is connected as the input device, and activates an emulation mode. The emulation mode is set by turning on (setting) an emulation flag in the emulation flag area 15. Subsequently to the setting of the emulation flag, the emulation processing section 19 is activated to initiate the mouse emulation.

On the other hand, when the mouse 7 is connected to the connector 11, that is, when the mouse 7 is used as the input device, the emulation activation judging section 12 does not activate the emulation mode but activates the normal mode. That is, the emulation flag in the emulation flag area 15 is turned off (reset). As a result, the emulation processing section 19 is not activated, but a mouse signal processing section 20 is activated.

The emulation flag area 15 is formed from a designated area within memory of the main unit 1; This memory area is an area shared by the mouse basic input/output section 3 and the mouse input/output control section 4 to transfer control information for mouse emulation from the former to the latter. A designated bit of a register in the CPU of the main unit 1 may be used to implement this flag area.

After the processing by the emulation activation judging section 12 is completed, the initialization processing section 13 carries out the necessary initialization processing preparatory to reading position information from the mouse 7 or the pad 6. With the initialization processing, initial coordinates are set for the mouse 7 and the mouse cursor 23, a timer 16 is set, and a sense information area 17 is reserved.

As the timer 16 is set, the mouse input/output control section 4 is called periodically at prescribed intervals of time to read position information from the mouse 7 or the pad 6. This position information (hereinafter called the sense information) is written into the sense information area 17.

By the use of the timer 16, the mouse 7 or the pad 6 (in particular, the sense information) is controlled periodically. The sense information area 17 is formed from a designated area within memory of the main unit 1. This memory area is an area shared by the mouse input/output control section 4 and the mouse basic input/output section 3 to transfer the sense information periodically from the former to the latter.

The mouse reading section 14, when called from the application program 2, reads the sense information from the mouse input/output control section 4 and passes it to the application program 2. More specifically, the sense information is first read out from the sense information area 17, and the readout sense information is then converted to data of a prescribed type, i.e., a function, before being passed to the application program 2.

The initialization processing section 13 and the mouse reading section 14 together may be considered as constituting a known basic input/output system (BIOS) which is responsible, in particular, for the control of the mouse.

The mouse input/output control section 4 comprises the flag judging section 18, emulation processing section 19, mouse signal processing section 20, plus a drawing processing section 21.

The mouse input/output control section 4 is called when a timer interrupt is caused by the timer 16. This interrupt is caused periodically at prescribed intervals of time. When the mouse input/output control section 4 is called by this interrupt, the flag judging section 18 judges the on or off state of the emulation flag by referencing the emulation flag area 15.

When the emulation flag is off, the flag judging section 18 determines that the emulation processing section 19 need not be activated, so that the mouse signal processing section 20 is activated to initiate the usual processing to read output signals of the mouse 7.

When the emulation flag is on, then the flag judging section 18 determines that the emulation processing section 19 needs to be activated to carry out the mouse emulation. The emulation processing section 19 is thus activated to initiate the mouse emulation using output signals of the pad 6.

The mouse signal processing section 20 and the drawing processing section 21 together may be considered as constituting a known mouse driver which is responsible, in particular, for the management of the mouse 7. The mouse signal processing section 20, working in conjunction with the drawing processing section 21, performs the necessary processing for display, erasure, position information read, movement, etc., of the mouse cursor 23.

When activated, the mouse signal processing section 20 reads the signals being applied to the connector 11 from the outside of the main unit 1. Since the mouse 11 is connected to the connector 11, the output signals of the mouse 7 being applied at that instant in time are read in.

The mouse signal processing section 20 determines a (new) position of the mouse cursor 23 on the basis of the thus read output signals of the mouse 7. That is, the amounts of movements of the mouse cursor 23 in X (horizontal) and Y (vertical) directions are obtained from data relating to the amount of movement of the ball. Then, the coordinates of the new position are calculated from the coordinates of the immediately preceding position of the mouse cursor 23 and the amounts of movement in X and Y directions. The coordinates of the immediately preceding position of the mouse cursor 23 are held, for example, in the mouse signal processing section 20.

The amount and speed of the movement of the mouse cursor 23 on the display device 22 are related to the amount of the movement (of the ball) of the mouse 7.

The mouse signal processing section 20 writes the new coordinates of the mouse cursor 23 into the sense information area 17. The amounts of movements of the ball in X and Y directions are also written together with the new coordinates. Data relating to the pressing of the right and left buttons are also written in the sense information area 17. These pieces of information together constitute the sense information. The sense information is used by the application program 2 for various kinds of processing. The processing includes, for example, selecting a menu at the coordinates at which the mouse cursor 23 is positioned when the left button is pressed.

The new coordinates of the mouse cursor 23 are also fed to the drawing processing section 21 from the mouse signal processing section 20. Based on the new coordinates of the mouse cursor 23, the drawing processing section 21 draws (displays) the mouse cursor 23 on the display device 22 by moving the mouse cursor 23 from the previous position to the position designated by the new coordinates.

Figure 2:
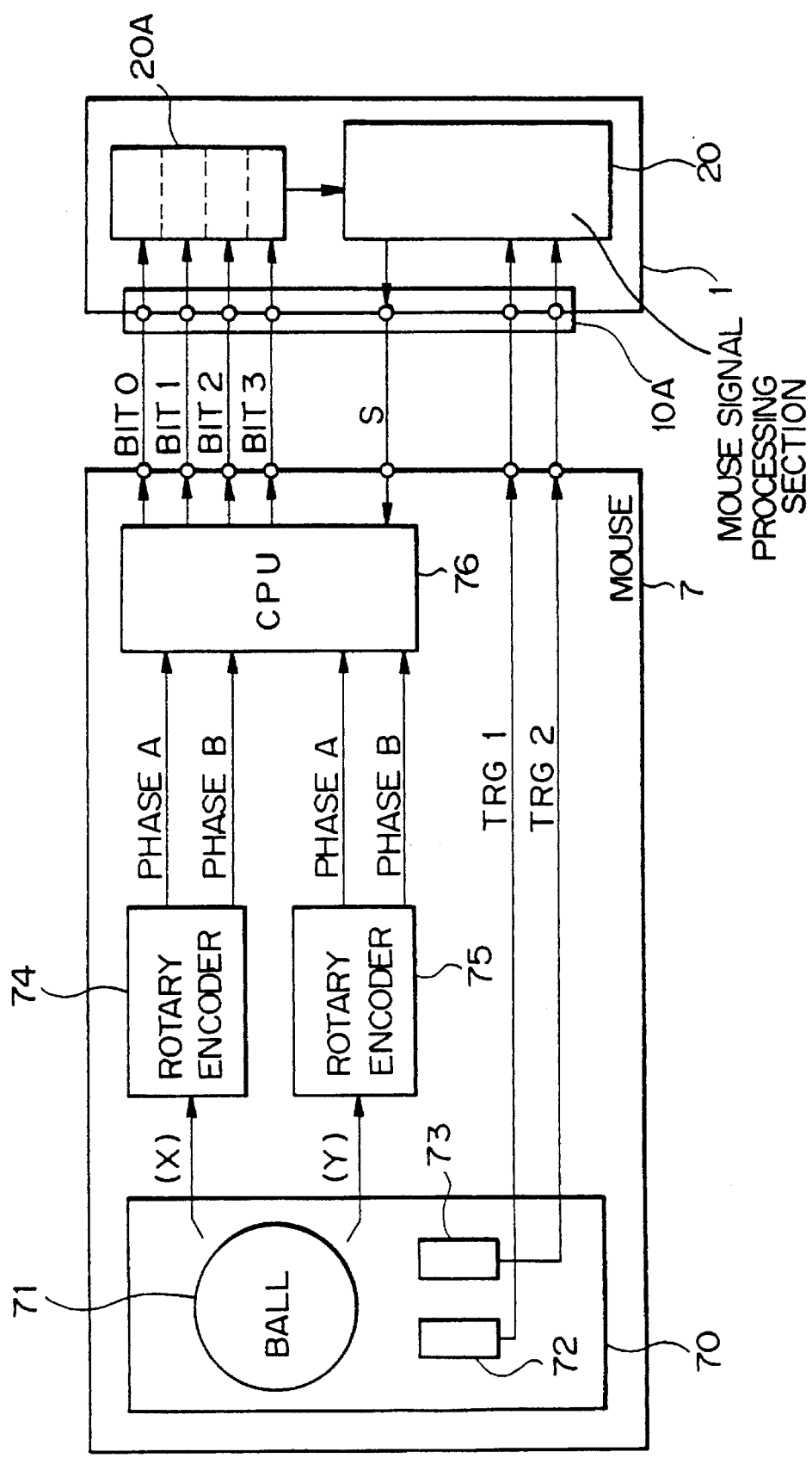
FIG. 2 is a diagram showing the configuration of a mouse.

FIG. 2 is a diagram showing the configuration of the mouse. The mouse 7 will be described in detail below with reference to this diagram.

As is well known, the mouse 7 includes a ball 71, a left button 72, and a right button 73 on an operating surface that the operator operates. The ball 71 is set in the bottom of the mouse 7, while the left and right buttons 72 and 73, respectively are provided on the upper surface of the mouse 71.

Rotary encoders 74 and 75 are provided to detect the direction and amount of rotation of the ball 71 and output them as electrical signals. The rotary encoder 74 detects the amount of rotation in X direction and outputs either a PHASE A (leftward) or PHASE B (rightward) signal. The output signal comprises the number of pulses that correspond to the amount of rotation. Likewise, the rotary encoder 75 detects the amount of rotation in Y direction and outputs either a PHASE A (upward) or PHASE B (downward) signal (pulse signal).

The pulse outputs of the rotary encoders 74 and 75 are fed to a central processing unit (CPU) 76. The CPU 76 performs prescribed processing on the pulse outputs fed from the rotary encoders 74 and 75, to calculate the amount of movement of the ball 71 in X and Y directions and write the results to a designated register.

The mouse signal processing section 20 in the main unit 1, when activated, sends a strobe signal S to the CPU 76 in the mouse 7 at prescribed timing. When the strobe signal S is received, the CPU 76 reads data relating to the amount of movement of the ball 71 from the designated register that holds the data relating to the amounts of movements of the ball 71 and obtained by processing the pulse signals received from the encoders 74 and 75. The readout data is then sent to the main unit 1.

Figure 3:
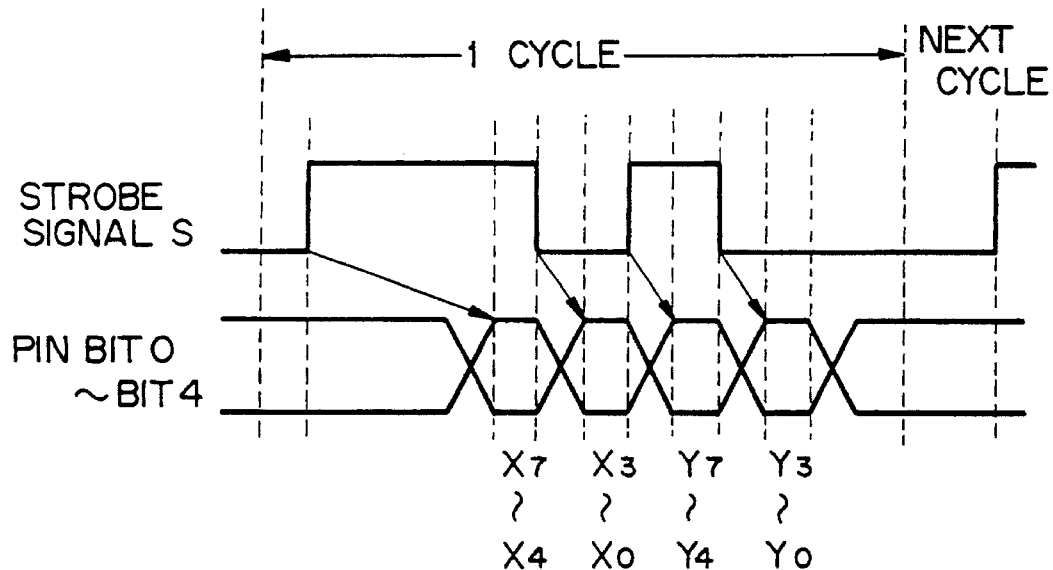
FIG. 3 is a timing chart for explaining an operation of data input from the mouse to the main unit.

The data relating to the amount of movement of the ball 71 comprises of eight bits each for X and Y directions (a total of 16 bits). The 16-bit data is sent at the timing shown in FIG. 3. Two strobes S are sent, one for the X-direction data and the other for the Y-direction data, as shown in FIG. 3.

In synchronism with the rising of the X-direction (first) strobe S, the four high-order bits (X7–X4) of the 8-bit data representing the amount of movement in the X direction are sent to pins of bit 0–bit 4. In synchronism with the falling of the first strobe S, the four low-order bits (X3–X0) of the 8-bit data representing the amount of movement in X direction are sent to pins of bit 0–bit 4.

In synchronism with the rising and falling of the Y-direction (second) strobe S, respectively, the four high-order bits (Y7–Y4) and four low-order bits (Y3–Y0) of the 8-bit data representing the amount of movement in Y-direction are sent to pins of bit 0–bit 4.

The above data designates relative coordinates with respect to the position coordinates designated by the immediately preceding data. The rightward and downward directions are given by negative numbers, and the leftward and upward directions are given by positive numbers. Further, the 8-bit data for the X and Y directions is each expressed in two's complement form.

The data is temporarily stored in register 20A. The register 20A is a register that the main unit 1 has, and serves as a buffer register. The data stored in the register 20A is latched into the mouse signal processing section 20 just before the next 4-bit data is sent.

Along with the b 16-bit data relating to the amounts of movements of the ball, the data relating to the pressing/releasing of the left and right buttons 72 and 73 are also read into the mouse signal processing section 20. The signal from the left button 72 is read as a TRG 1 signal, and the signal from the right button 73 as a TRG 2 signal. These signals are used as input trigger signals, etc., to reposition the mouse cursor 23. It will be noted that the signals from the left and right buttons 72 and 73 are also temporarily stored in the 4th and 5th bits of the register 20A.

Using output signals of the pad 6, the emulation processing section 19 emulates the above-described processing performed by the mouse signal processing section 20, as a result of which the same sense information as described above is written into the sense information area 17 and the drawing processing section 21 is activated to perform the same processing for drawing the mouse cursor 23 as described above.

When activated, the emulation processing section 19 reads the signals being applied to the connector 10 from the outside of the main unit 1. Since the pad 6 is connected to the connector 10, the output signals of the pad 6 being applied at that instant in time are read in.

Figure 4:
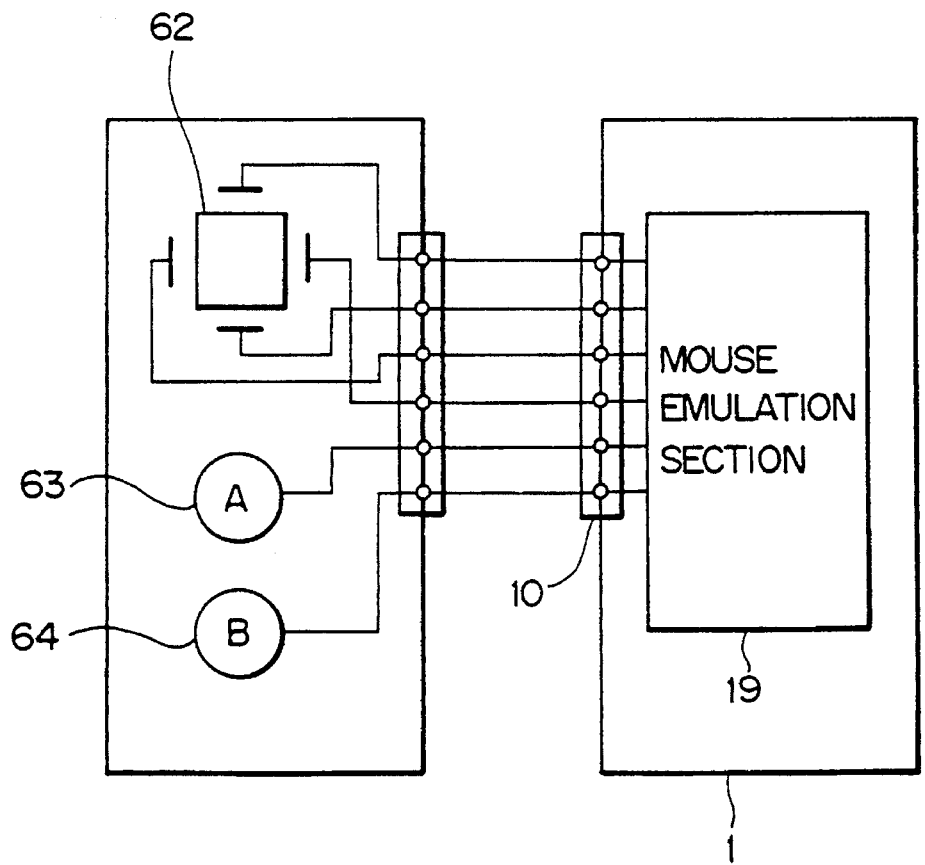
FIG. 4 is a diagram showing the configuration of a pad.

FIG. 4 is a diagram showing the configuration of the pad. The pad 6 usually includes a direction button 62, an A button 63, and a B button 64 on an operation surface that the operator operates. The direction button 62, which contains a lever switch or the like, is used to input the direction of movement as well as the amount of movement, and has a function equivalent to the ball 71 of the mouse 7. The A and B buttons 63 and 64 are used to input various timing signals (trigger signals), and have functions equivalent to the left and right buttons 72 and 73 of the mouse 7. Signals from the direction button, A button, and B button, respectively, are sent to the connector 10 from the pad 6.

Since the direction button is constructed from simple contact switches, the signals from the direction button do not require strobes from the emulation processing section 19. When the direction button is pressed in the upper right direction, for example, an upward direction signal and a rightward direction signal are continuously sent while the button is held down. The emulation processing section 19 reads, at prescribed timing, the signals being applied from the direction button during that time. The same applies to the A and B buttons.

The emulation processing section 19 determines a (new) position of the mouse cursor 23 on the basis of the thus read output signals of the pad 6. That is, the amounts of movements of the mouse cursor 23 in X (horizontal) and Y (vertical) directions are obtained from the signals fed from the direction button. Then, the coordinates of the new position are calculated from the coordinates of the immediately preceding position of the mouse cursor 23 and the amounts of movements in X and Y directions. The coordinates of the immediately preceding position of the mouse cursor 23 are held, for example, in the emulation processing section 19.

The amount and speed of the movement of the mouse cursor 23 on the display device 22 are related to the length of time during which the direction button is held down.

The emulation processing section 19 writes the new coordinates of the mouse cursor 23 into the sense information area 17. The length of time during which the direction button is held down is also written together with the new coordinates. Data relating to the pressing of the A and B buttons is also written in the sense information area 17. These pieces of information together constitute the sense information.

The new coordinates of the mouse cursor 23 are also fed to the drawing processing section 21 from the emulation processing section 19. Based on the new coordinates of the mouse cursor 23, the drawing processing section 21 draws (displays) the mouse cursor 23 on the display device 22 by moving the mouse cursor 23 from the previous position to the position designated by the new coordinates.

Of the output signals of the pad 6 read into the 10 emulation processing section 19, the signals from the direction button have fundamentally the same meaning as the signals that the encoders in the mouse 7 generate. More specifically, the signals from the direction button are equivalent to the signals from the encoders in that the direction and amount of the mouse cursor 23 are defined using four signals, i.e. the upward, downward, leftward, and rightward direction signals, the only difference being that the direction button signals are not pulse signals. Therefore, the signals from the direction button are directly analyzed to determine the direction and amount of movement.

For example, when the signals read from the direction button indicate that the direction button is held down in the upward direction, the coordinates of the mouse cursor 23 are moved in the upward direction.

The emulation processing section 19 may be configured so that the moving speed of the mouse cursor 23 is increased when the direction button is held down in one particular direction for a sustained period of time. Since the emulation processing section 19 may be considered as being activated by the timer 16, output signals from the pad 6 are read into it at fixed intervals of time. The emulation processing section 19 then compares the signal just read from the direction button with the preceding direction button signal, and when the signals are identical, the moving speed is increased.

Suppose, for example, that when the direction button is held down for a predetermined length of time, normally the mouse cursor 23 is moved by one pixel in the designated direction. If the present signal is identical to the preceding signal, then the mouse cursor 23 is moved by two pixels, and if it is identical to the two preceding signals, the mouse cursor 23 is then moved by three pixels. To achieve this, the emulation processing section 19 stores, for example, the last signal read from the direction button, plus the number of times that the result of the comparison matches up to that time (the contents are cleared when the result shows a mismatch).

By accelerating the mouse cursor 23, it is possible to even emulate the operation feeling of the mouse 7 that the operator feels when controlling the mouse cursor 23 with the mouse 7.

The movement of the mouse cursor 23 and the acceleration of the movement are stopped when the signal from the direction button indicates that the direction button is not held down in the same direction.

As can be understood from the processing performed, the emulation processing section 19 does not generate mouse emulation signals identical to the output signals of the mouse 7, but directly generates data (coordinate data, etc.) for use on the application program 2.

The processing operations performed by the data processing device of FIG. 1 will be described below with reference to FIGS. 5 to 7.

Figure 5:
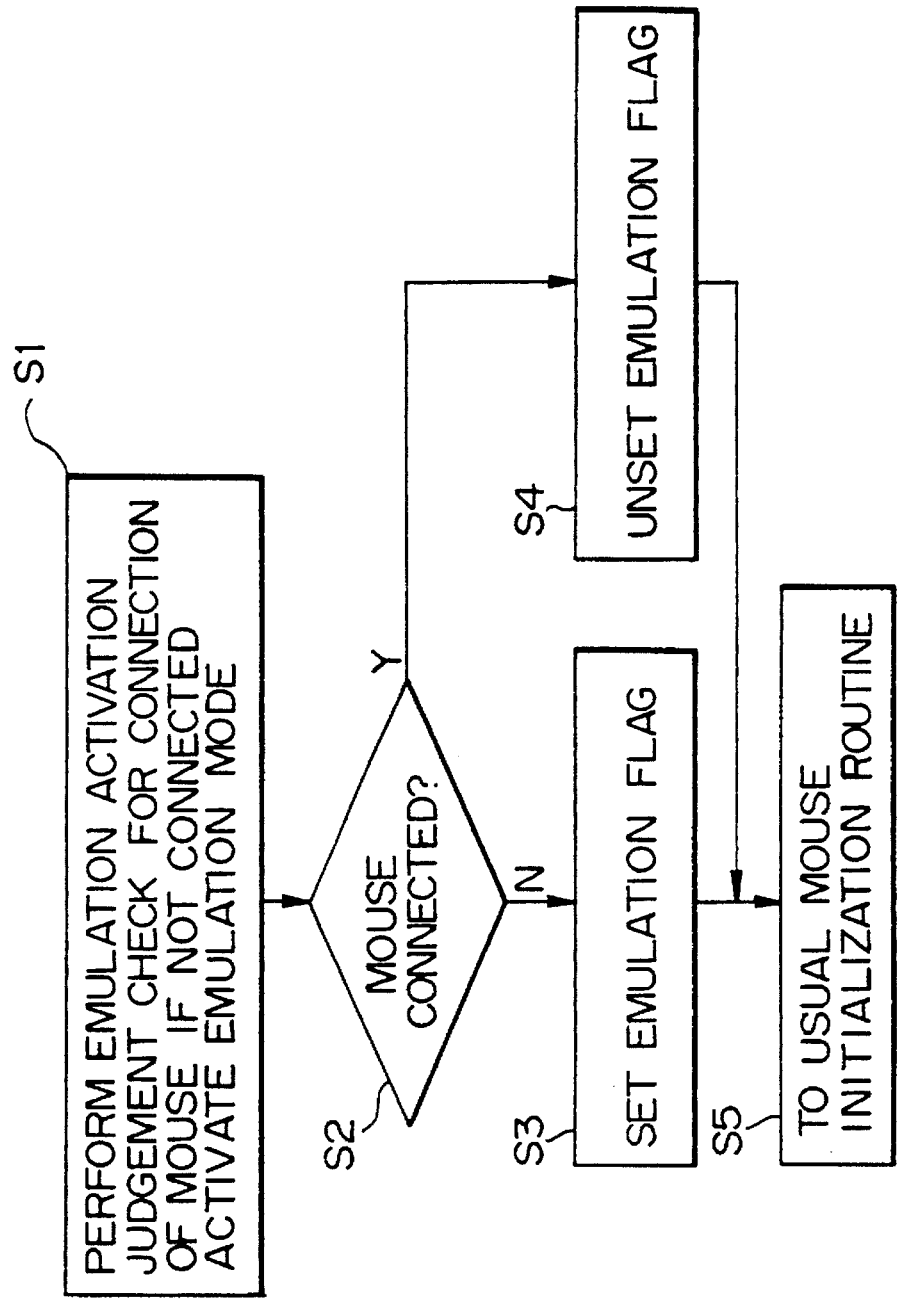
FIG. 5 is a flowchart illustrating an initialization process according to the first embodiment.

FIG. 5 is a flowchart illustrating the initialization process. In FIG. 5, the application program 2, when activated, calls the initialization routine in the mouse basic input/output section 3 since the program is designed for operation through input from the mouse 7.

In step S1 of the initialization routine, the emulation activation judging section 12 performs emulation activation judgement. That is, the connector 11 is checked for connection of the mouse 7, and if not connected, the emulation mode is activated.

More specifically, the emulation activation judging section 12 checks the connector 11, and in step S2, determines whether or not the mouse 7 is connected to the connector 11. If the mouse 7 is not connected, the operation proceeds to step S3 in which the emulation activation judging section 12 sets the emulation flag in the emulation flag area 15. If the mouse 7 is connected, the operation proceeds to step S4 in which the emulation flag in the emulation flag area 15 is unset.

After the activation of the emulation mode is completed, the initialization processing section 13 performs prescribed initialization processing in step S5. With this initialization processing, the timer 16 is started, and thereafter, the mouse input/output control section 4 is called periodically. At the same time, the sense information area 17 is reserved.

Figure 6:
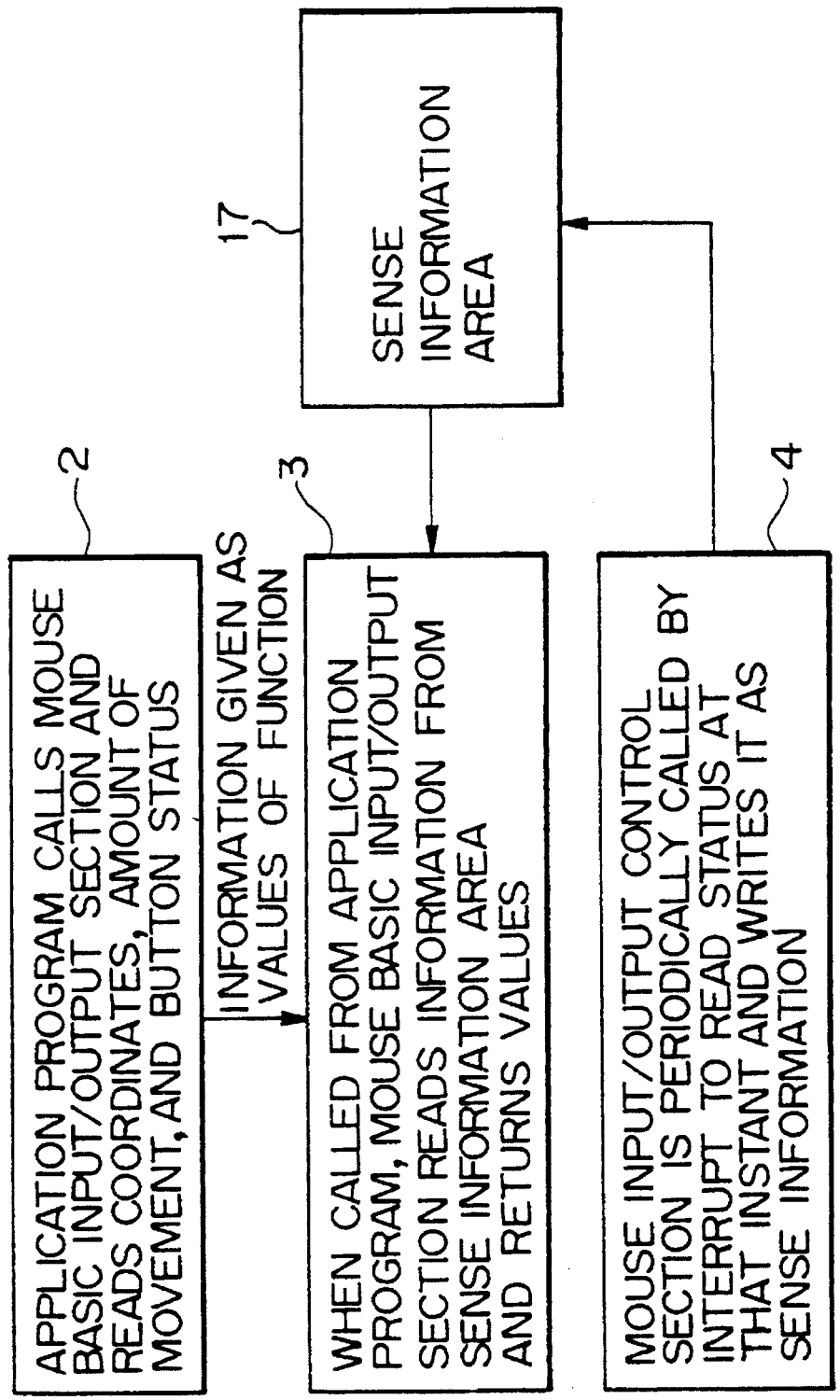
FIG. 6 is a diagram showing operations of various sections in relation to sense information according to the first embodiment.

FIG. 6 is a diagram showing the operations of the various sections for processing the sense information. As shown in FIG. 6, the application program 2 calls the mouse basic input/output section 3 (more properly, the mouse reading section 14), and reads information on the coordinates of the mouse cursor 23, the amount of movement of the ball, and the pressing of the buttons, i.e., the sense information. The sense information is given as values of functions.

As shown in FIG. 6, when the mouse basic input/output section 3 is called from the application program 2, the mouse reading section 14 reads the sense information from the sense information area 17 and produces outputs as values of functions which are then returned to the application program 2.

As shown in FIG. 6, the mouse input/output control section 4 is periodically called by a timer interrupt from the timer 16, reads the output signal status of the mouse 7 or the pad 6 at that instant in time, and writes the sense information into the sense information area 17.

Figure 7:
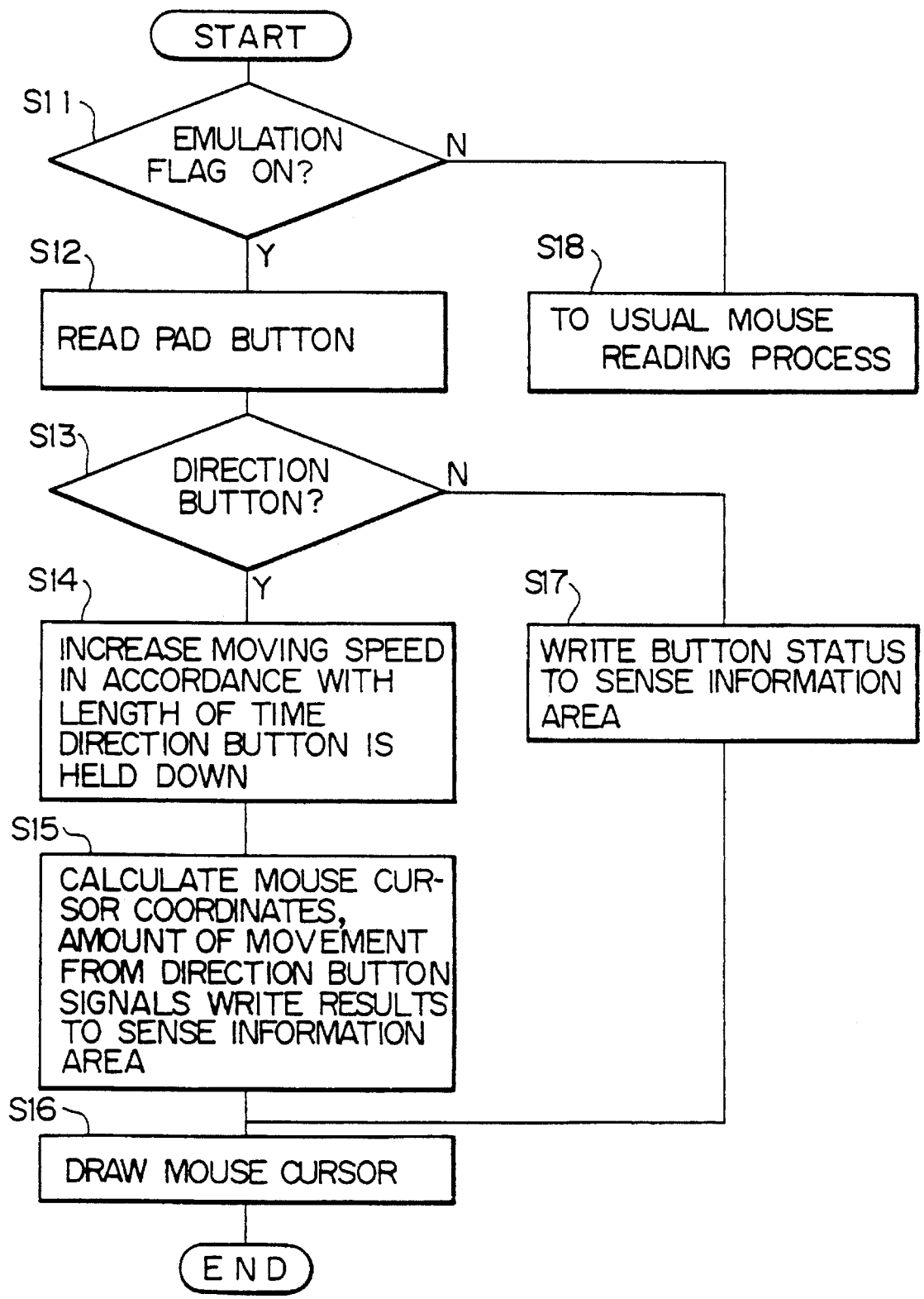
FIG. 7 is a flowchart illustrating the processing performed in a mouse input/output control section according to the first embodiment.

The processing performed by the mouse input/output control section 4 is illustrated in FIG. 7.

In FIG. 7, when the mouse input/output control section 4 is called, the flag judging section 18 judges, in step S11, the on or off state of the emulation flag by referencing the emulation flag area 15.

If the emulation flag is on, the flag judging section 18 activates the emulation processing section 19, and the operation proceeds to step S12 to initiate the emulation (mode).

In step S12, the activated emulation processing section 19 reads an output signal from the pad 6. The pad 6, which is connected to the connector 10, is generating signals related to the operation being performed by the operator.

In step S13, the emulation processing section 19 examines the signal read from the pad 6 to determine if the signal is from the direction button.

If the signal is from the direction button, the emulation processing section 19 directs, in step S14, that the moving speed be increased (acceleration) in accordance with the length of time the button is held down.

In practice, this acceleration processing is performed as follows. The emulation processing section 19 contains an acceleration table (not shown) that stores acceleration data corresponding to the button hold-down time. The emulation processing section 19 first obtains the direction button hold-down time, and then references the acceleration table to find the acceleration data corresponding to the hold-down time. The hold-down time is given as the number of occurrences of the timer interrupt, i.e., the number of successive occurrences of the timer interrupt which indicate that the direction button is held down in the same direction.

Here, the acceleration data indicates, for example, the amount of movement of the mouse cursor 23. This data is made small (so that the mouse cursor 23 is moved at slow speed) when the hold-down time is short, and is made larger as the hold-down time increases (so that the mouse cursor 23 is moved at a faster speed).

Therefore, by increasing the hold-down time and thus activating the acceleration processing, the mouse cursor 23 can be moved in a short time (practical time or real time) from the left to the right edge of the screen of the display device 22. On the other hand, by making the hold-down time very short, the mouse cursor 23 can be moved by one pixel at a time.

Suppose, for example, that the screen of the display device 22 consists of 640 (row direction)×480 (column direction) dots and an interrupt from the timer occurs about 50 times per second. In this case, if the mouse cursor 23 moves by one dot with each occurrence of the timer interrupt, it will take the cursor 23 about 13 seconds to move from the left to the right edge of the screen. If the moving speed is increased up to four times the initial speed, the moving time will be shortened from 13 seconds to about four seconds. This is a practical speed.

The acceleration is achieved by gradually increasing the amount of movement per timer interrupt (initially, one dot) at a rate of, for example, one dot for every five or ten timer interrupts, until the final moving speed of four dots per timer interrupt, i.e., four times the initial speed, is reached.

The acceleration rate can be set in various ways, but from the practical point of view, four times the initial speed is the optimum acceleration rate. For example, when the mouse 7 is used, the moving speed of the mouse cursor 23 is about 800 dots per second. If accelerated up to this speed, the mouse cursor 23 would move the distance of 16 dots with each timer interrupt. However, it takes at least about 0.1 second from the moment that a person presses the direction button to the moment that he releases the button, which means the mouse cursor 23 would move the distance of 80 dots at minimum with one operation of the button. This is not practical.

Referring back to the flowchart of FIG. 7, in step S15 the emulation processing section 19 determines the new coordinates and the amount of movement of the mouse cursor 23 on the basis of the direction button signals and the acceleration data, and writes the results into the sense information area 17 as the sense information.

In step S16, the drawing processing section 21, which has received the new coordinate position of the mouse cursor 23 from the emulation processing section 19, draws the mouse cursor 23 on the display device 22.

If, in step S13, the output signal read from the pad 6 is not one from the direction button, the operation proceeds to step S17 in which the emulation processing section 19 writes the press/release status of the A and B buttons of the pad 6 into the sense information area 17.

In step S11, if the emulation flag is not on (but off), the operation proceeds to step S18 in which the flag judging section 18 activates the mouse signal processing section 20 to initiate the usual processing to read mouse signals.

For example, the mouse signal processing section 20 reads an output signal from the mouse 7. If the signal read from the mouse 7 is data relating to the amount of movement of the ball, the mouse signal processing section 20 calculates the coordinates of the new position of the mouse cursor 23 and writes the result into the sense information area 17, while causing the drawing processing section 21 to draw the mouse cursor 23 at the new position. If the output signal is data relating to the pressing, etc., of the right or left button, the state of the button is written into the sense information area 17.

The acceleration table used in step S14 may be made up of more than one kind. For example, four kinds of tables may be prepared: a slow table, a slightly slow table, a normal table, and a fast table. If the normal table is defined such that the moving speed increases at a rate of one dot for every ten timer interrupts, for example, the slow table may be defined such that the speed increases at a rate of one dot for every 20 timer interrupts, and likewise, every 15 timer interrupts in the case of the slightly slow table, and every five timer interrupts in the case of the fast table.

Furthermore, the plurality of acceleration tables may be used selectively. To achieve this, a START button or a SELECT button, provided on the pad 6 separately from the A and B buttons, may be used as a selecting means (the description below assumes the use of the START button).

The START button is used as a moving speed selector switch. As the START button is pressed, the emulation processing section 19 selects one table from among the four tables in a predetermined order. The moving speed can thus be changed in a cyclic manner by pressing the START button.

This arrangement allows for the difference in response speed among individual operators who operate the pad 6.

Furthermore, the acceleration processing itself may be omitted. To achieve this, the START button or the SELECT button, provided on the pad 6 separately from the A an B buttons, will be used as a selecting means (the description below assumes the use of the SELECT button).

The SELECT button is used as a selector switch for directing whether to activate or not activate the acceleration function. When the SELECT button is pressed, the emulation processing section 19 skips step S14 and jumps to step S15 after completing step S13. The mouse cursor 23 is moved by one dot at a time with each timer interrupt. Thus, when the operator is not a skilled person and therefore has difficulty in controlling the mouse cursor 23 by predicting the change of the acceleration rate, the acceleration processing may be omitted to prevent operating efficiency from dropping.

The first embodiment has been described above. The following description deals with another embodiment in which the mouse emulation section is contained in the main unit.

Figure 8:
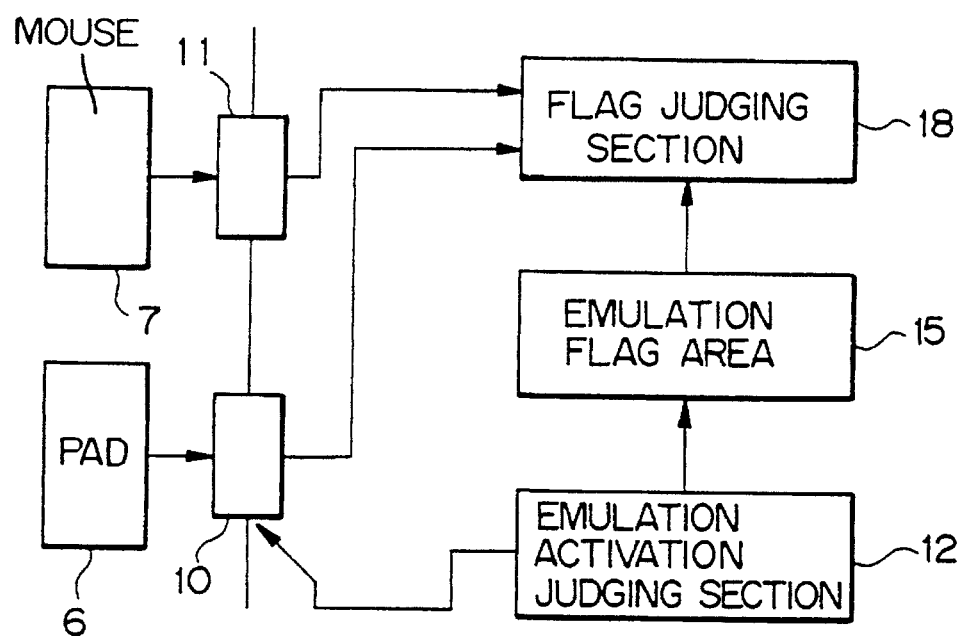
FIG. 8 is a block diagram showing the configuration of a portion of a data processing device according to a second embodiment of the invention.

FIG. 8 is a diagram showing the configuration of the second embodiment. The figure shows only a part that corresponds to the part of the data processing device of FIG. 1 that is responsible for flag judgement.

In FIG. 8, the emulation activation judging section 12 monitors the connector 10 for connection of the pad 6, instead of the connector 11 for connection of the mouse 7. Accordingly, in this embodiment, the emulation activation judging section 12 sets the emulation flag when the pad 6 is connected to the connector 10, and clears the emulation flag when the pad 6 is not connected.

In the embodiment of FIG. 8, as in the embodiment of FIG. 1, when the application program 2 (initially) activates the mouse basic input/output section 3, the connecting state of the connector 10 or 11 is examined to determine whether to activate or not activate the emulation mode. Therefore, as in the embodiment of Fig. 1, the operator need not know whether the application program 2 is designed for operation through input from the mouse 7. In this embodiment, both connectors 10 and 11 may be monitored for connection.

Figure 9:
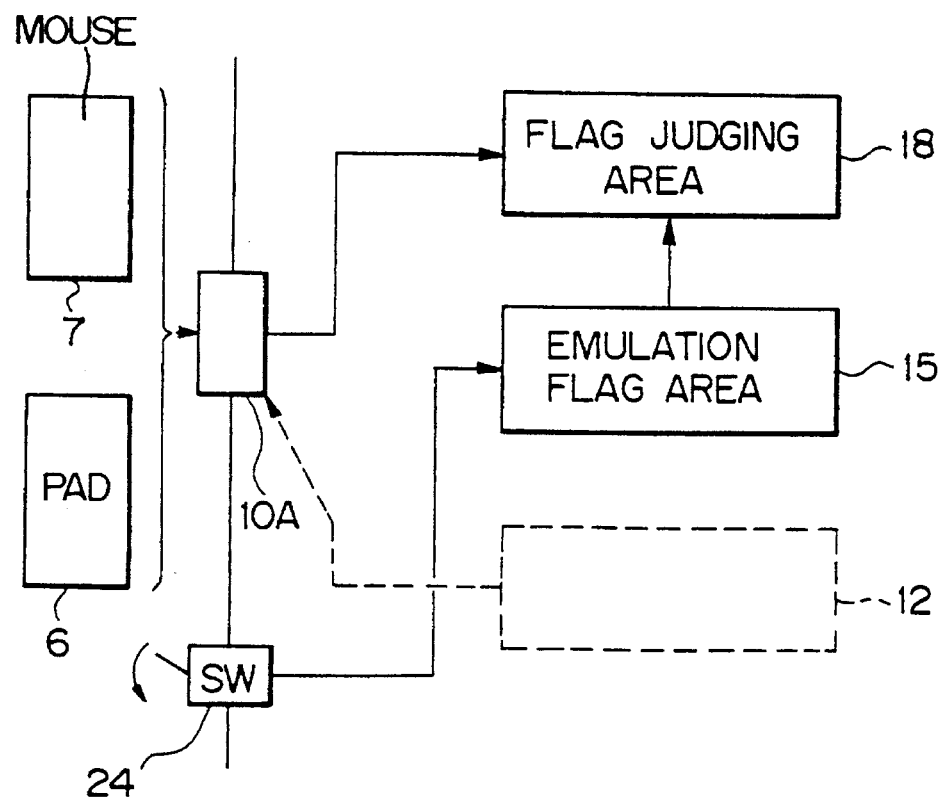
FIG. 9 is a block diagram showing the configuration of a portion of a data processing device according to a third embodiment of the invention.

FIG. 9 is a diagram showing the configuration of a third embodiment. The figure shows only a part that corresponds to the part shown in FIG. 8.

In the third embodiment, the operator directly sets the emulation flag in the emulation flag area 15. Therefore, the operator recognizes that the application program 2 is designed for operation through input from the mouse 7, and determines by himself whether to activate or not activate the emulation according to which input device, the mouse 7 or the pad 6, he uses.

In the third embodiment of FIG. 9, a switch 24 is provided externally to the cabinet of the main unit 1. Using the switch 24, the operator can directly turn on or off the emulation flag.

The third embodiment of FIG. 9 increases the amount of hardware required as it requires the provision of the switch 24. On the other hand, this eliminates the need for the emulation activation judging section 12, and thus helps to simplify the configuration of the mouse basic input/output section 3, allowing the use of a conventional mouse basic input/output section without any modification.

Furthermore, in the third embodiment of FIG. 9, a connector 10A mounted on the cabinet of the main unit 1 is common to the mouse 7 and the pad 6. This embodiment is therefore applicable to a case in which the mouse 7 and the pad 6 conform to a prescribed standard and their connectors are made to a common specification provided in the standard.

In this case, the upward direction signal, downward direction signal, leftward direction signal, and rightward direction signal from the pad 6 are applied to the same pins that are supplied with bits 0, 1, 2 and 4 of the output signals of the mouse 7. Further, the A and B button signals from the pad 6 are applied to the same pins that are supplied with the left and right button signals of the mouse 7.

The main unit 1 need not recognize which of the input devices, the mouse 7 or the pad 6, is connected. It is only required that the operator operate the switch 24 according to the input device connected. That is, when the pad 6 is used, the switch 24 is set to the pad input side, and the emulation flag is set.

The provision of the connector 10A does not necessarily require the provision of the switch 24. On the other hand, it will be appreciated that the switch 24 is also useful in the configurations illustrated in FIGS. 1 and 8 where the two connectors 10 and 11 are provided. It will also be appreciated that in the configuration where only the one connector 10A is provided, the on/off of the emulation flag can be controlled by means other than the switch 24.

More specifically, when the pad 6 is connected to the connector 10A, the pin to which the strobe signal is applied is left open.

Therefore, it would be possible to determine that the pad 6 is connected when this state is detected. Furthermore, the upward direction signal, downward direction signal, leftward direction signal, and rightward direction signal generated by the pad 6 are sent continuously for a sustained period independently of the strobe signal sent from the main unit 1. Therefore, it would also be possible to determine that the pad 6 is connected when this state is detected. To accomplish such detection, the emulation activation judging section 12 monitors the connector 10A, as shown by a dashed line in FIG. 9.

In any of the above embodiments, the data processing device has been described that runs the application program 2 originally designed for operation through input from the mouse 7. However, a configuration is also possible such that an application program 2A designed for operation through input from the pad 6, as well as the application program 2 designed for operation through input from the mouse 7, can be run on the same data processing device.

Figure 10:
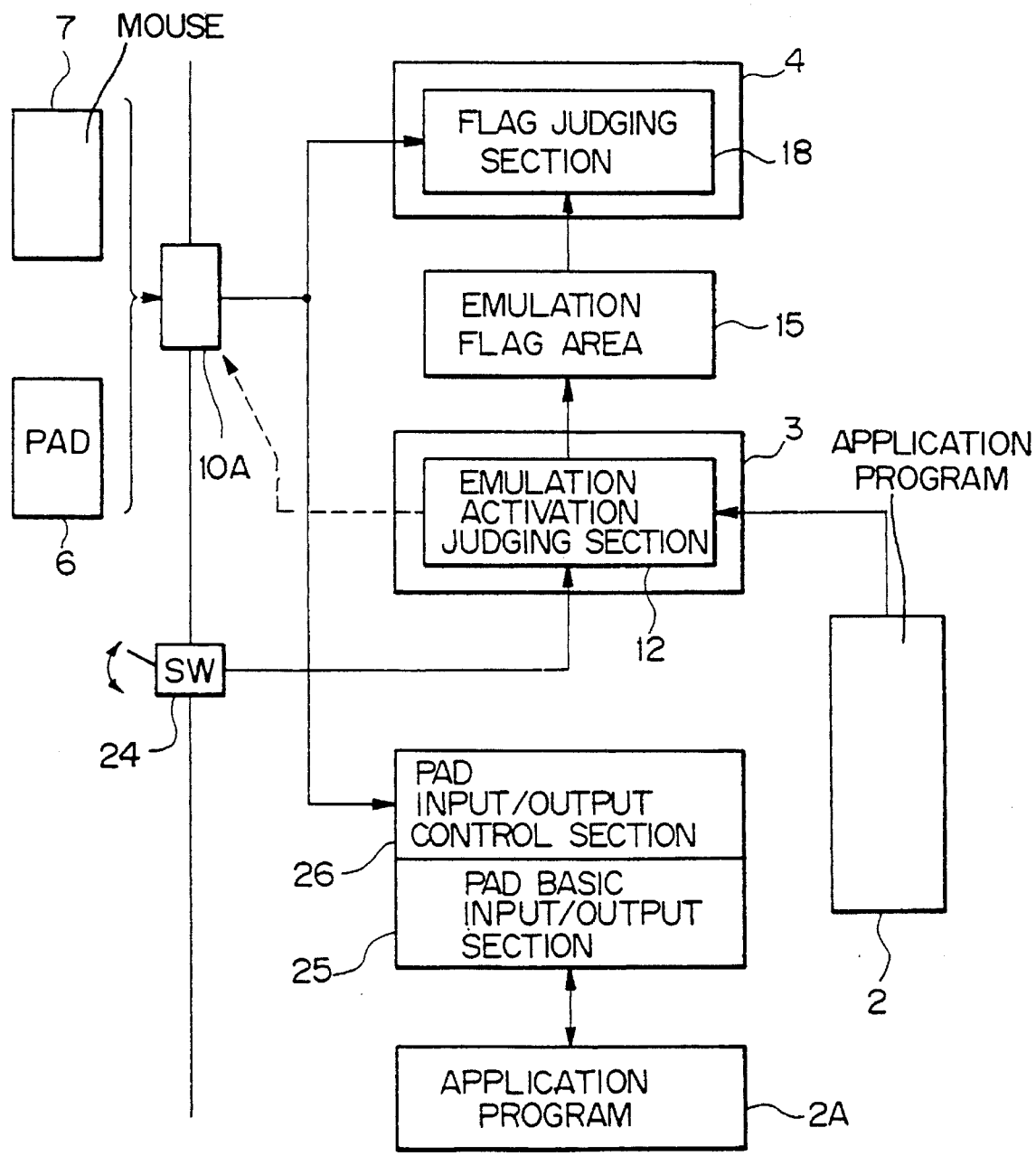
FIG. 10 is a block diagram showing the configuration of a data processing device according to a fourth embodiment of the invention.

FIG. 10 is a diagram showing the configuration of a fourth embodiment.

As shown in FIG. 10, signals from the mouse 7 and the pad 6 are input to the mouse input/output control section 4 via the connector 10A to enable the application program 2 to be operated from the mouse 7 or the pad 6, whichever one is connected.

Since the application program 2A allows input only from the pad 6, a pad input/output section 26 is provided which accepts signals from the pad 6 via the connector 10A.

Emulation mode control in the fourth embodiment of FIG. 10 can be accomplished by either of the previously described means: the emulation activation judging section 12 monitors the connector 10A or the switch 24 is used to directly set the emulation flag. In the latter case, the emulation activation judging section 12 can be eliminated.

When the mouse 7 is used to operate the application program 2, the usual processing by the mouse signal processing section 20 is performed. When the pad 6 is used to operate the application program 2, the emulation mode is activated so that the processing is performed by the emulation processing section 19. When the pad 6 is used to operate the application program 2A, the pad input/output control section 26 performs the necessary processing in conjunction with a pad basic input/output section 25.

The pad basic input/output section 25 and the pad input/output control section 26 are of known configuration and correspond to the mouse basic input/output section 3 and the mouse input/output control section 4, respectively. These sections may be constructed as an integral unit.

If it is attempted to operate the application program 2A from the mouse 7, the operation will not be accepted.

In the above-described embodiments, the main unit 1 is provided with two connectors, the connector 11 for the mouse 7 and the connector 10 for the pad 6, or alternatively with a single connector, the connector 10A, common to the mouse 7 and the pad 6. In a further alternative construction, only the connector 10 may be provided.

Figure 11:
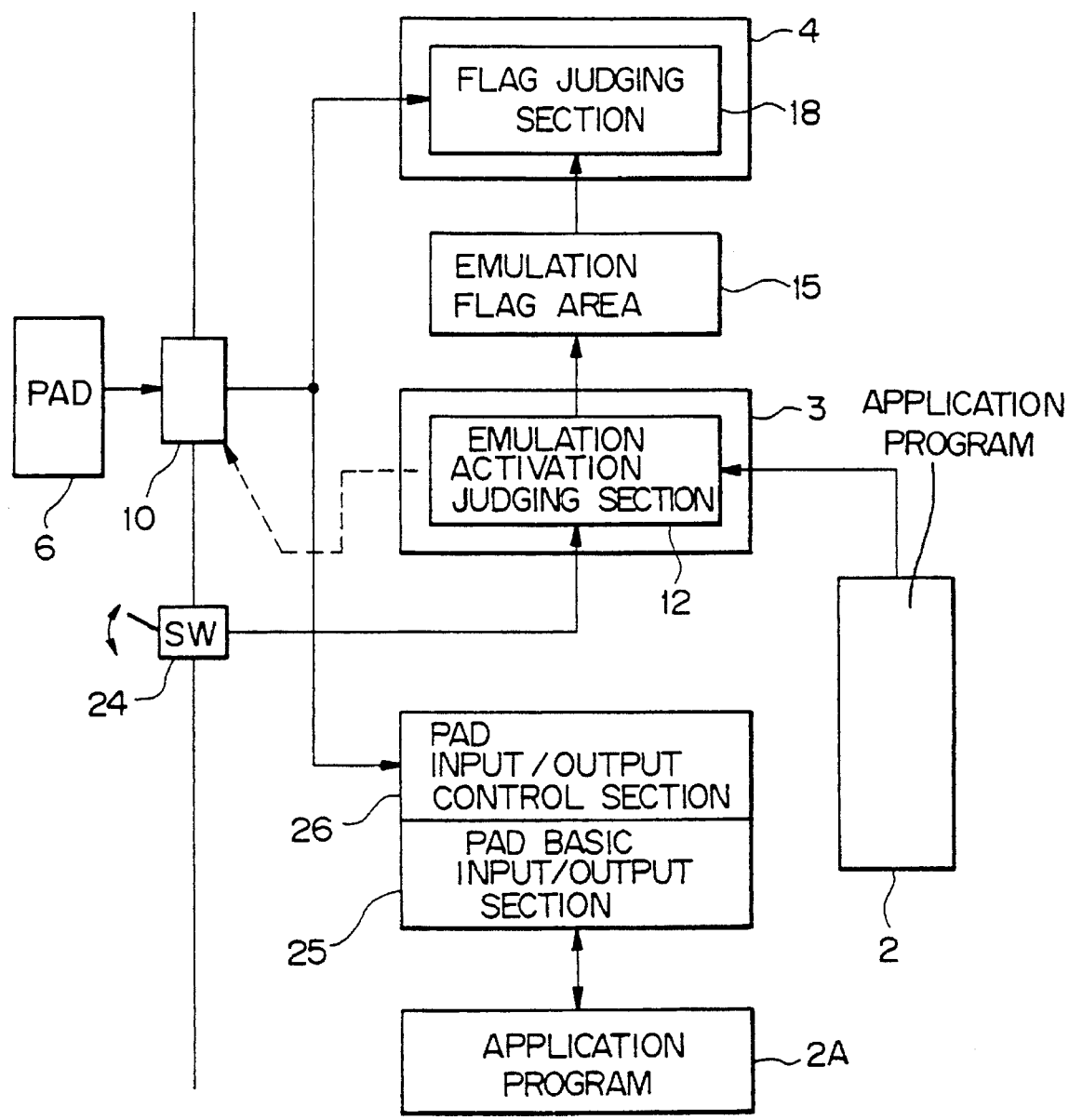
FIG. 11 is a block diagram showing the configuration of a data processing device according to a fifth embodiment of the invention.

FIG. 11 shows the configuration of a fifth embodiment.

The fifth embodiment is concerned with an example in which the connector 11 for the mouse 7 in the first embodiment of FIG. 1 is eliminated. Therefore, the mouse 7 cannot be connected to the data processing device of this embodiment, but the application program 2 designed for operation through input from the mouse 7 can be run 10 on this data processing device.

As shown in FIG. 11, the mouse basic input/output section 3 and the mouse input/output control section 4 of the invention are incorporated into the data processing device to enable the application program 2 to be operated from the pad 6. It is clear that the application program 2A can be operated using the pad 6.

To set the emulation flag in the emulation flag area 15, either the emulation activation judging section 12 monitors the connector 10 (as shown in FIG. 8), or the switch 24 is used directly to set the flag (as shown in FIG. 9). In the case of the configuration using the switch 24, the emulation activation judging section 12 can be eliminated.

According to the embodiment shown in FIG. 11, the mouse basic input/output section 3 and the mouse input/output control section 4 developed for the data processing device of FIG. 1 can be used without any modification. Furthermore, the application program 2 can be run on a data processing device that assumes the use of the pad 6 as the only input device.

Figure 12:
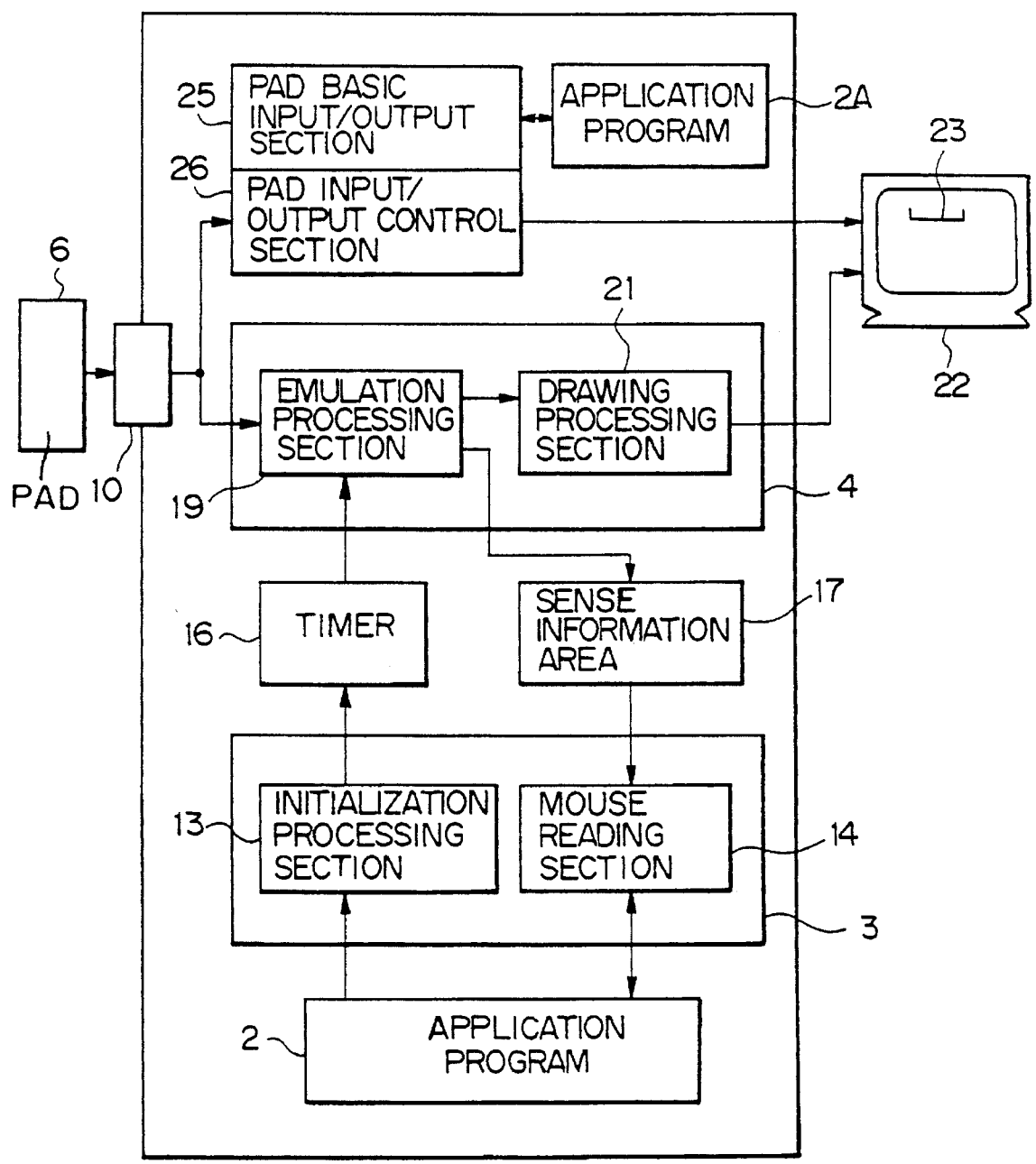
FIG. 12 is a block diagram showing the configuration of a data processing device according to a sixth embodiment of the invention.

FIG. 12 shows a sixth embodiment which is concerned with an example in which the mouse basic input/output section 3 and the mouse input/output control section 4 are simplified in configuration considering the condition that all data inputs are possible from the pad 6. More specifically, the emulation activation judging section 12 is eliminated from the mouse basic input/output section 3, and the flag judging section 18 and the mouse signal processing section 20 are eliminated from the mouse input/output control section 4. Furthermore, there is no need to provide the emulation flag area 15.

In the sixth embodiment, when the pad 6 is used to operate the application program 2A, the pad basic input/output section 25 and the pad input/output control section 26 perform the necessary processing.

On the other hand, when the pad 6 is used to operate the application program 2, first the application program 2 calls the initialization processing section 13 which then activates the timer 16. Processing for setting the emulation flag is not performed.

The emulation processing section 19 is called periodically by a timer interrupt from the timer 16, reads an output signal from the pad 6, performs emulation using this signal, and writes prescribed data into the sense information area 17 while causing the drawing processing section 21 to draw the mouse cursor 23.

When called from the application program 2, the mouse reading section 14 reads the sense information from the sense information area 17 and returns it to the application program 2.

According to the sixth embodiment of FIG. 12, the mouse basic input/output section 3 and the mouse input/output control section 4 can be simplified in configuration (hence, a reduced program size). Most of the data processing devices that are designed to allow connection of the pad 6 only, do not have a large memory capacity. The configuration of the sixth embodiment makes it easier to incorporate the mouse basic input/output section 3 and the mouse input/output control section 4 into such data processing devices.

In the first to sixth embodiments so far described, the emulation section processes the output signals of the pad and generates data that can be directly passed to the application program. That is, the emulation section also performs the same processing as that of the mouse signal processing section 20. However, when the mouse signal processing section 20 is contained in the main unit 1, it is also possible to supply the pad signals to the mouse signal processing section 20 after simply converting them to signals of the type identical to that of the mouse output signals. The seventh embodiment hereinafter described implements such a configuration.

Figure 13:
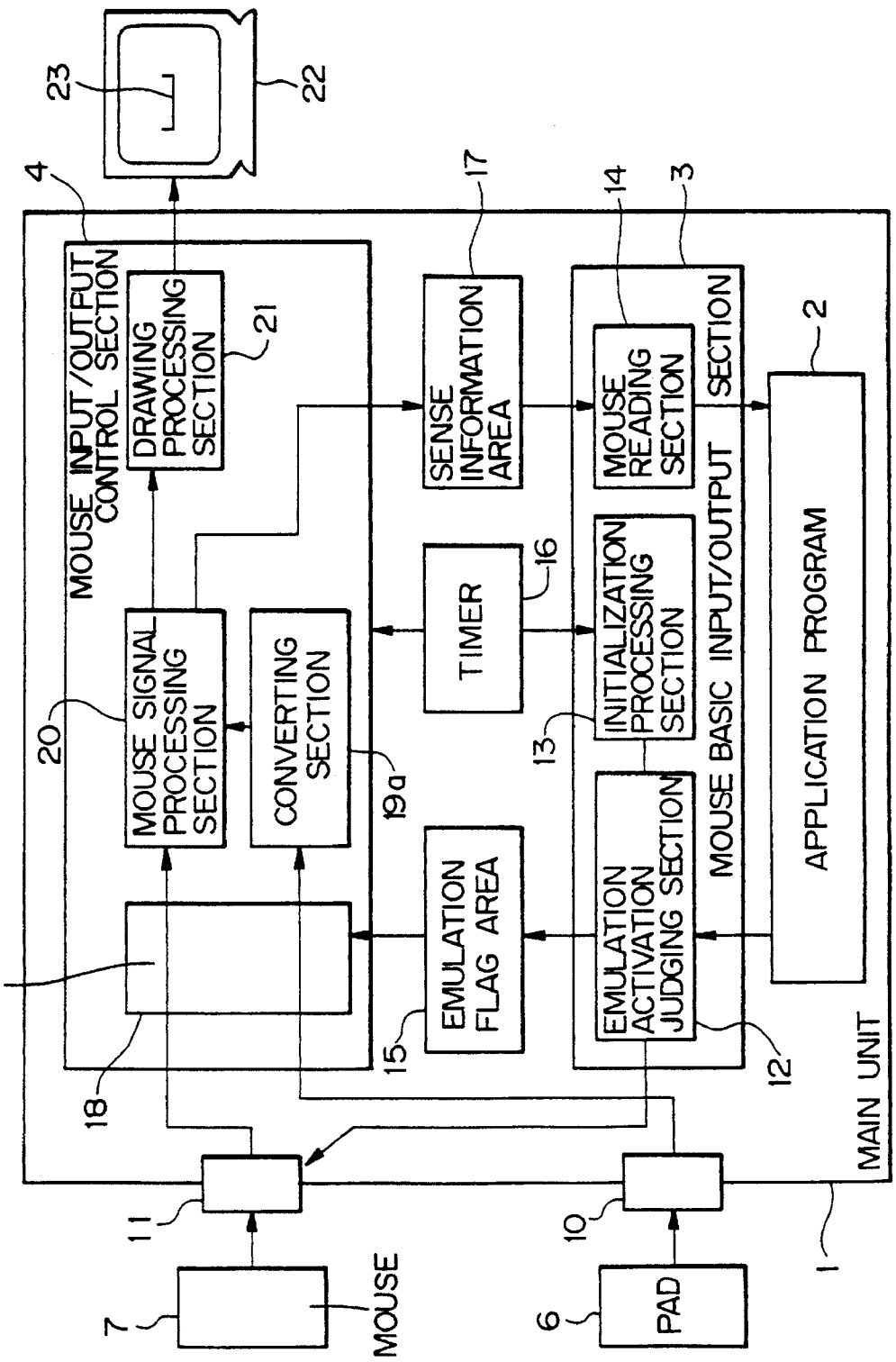
FIG. 13 is a block diagram showing the configuration of a data processing device according to a seventh embodiment of the invention.

FIG. 13 is a block diagram showing the configuration of a data processing device according to the seventh embodiment.

In FIG. 13, a converting section 19a is a section for converting output signals of the pad 6 to signals of the type identical to that of the output signals of the mouse in accordance with the procedure so far described. The output of the converting section 19a is coupled to the mouse signal processing section 20. Otherwise, the configuration is the same as that of the foregoing embodiments.

In the first to seventh embodiments described above, the emulation section is provided in the main unit, but in an alternative configuration, the emulation section may be incorporated in the pad. An embodiment implementing such a configuration will be described below.

Figure 14:
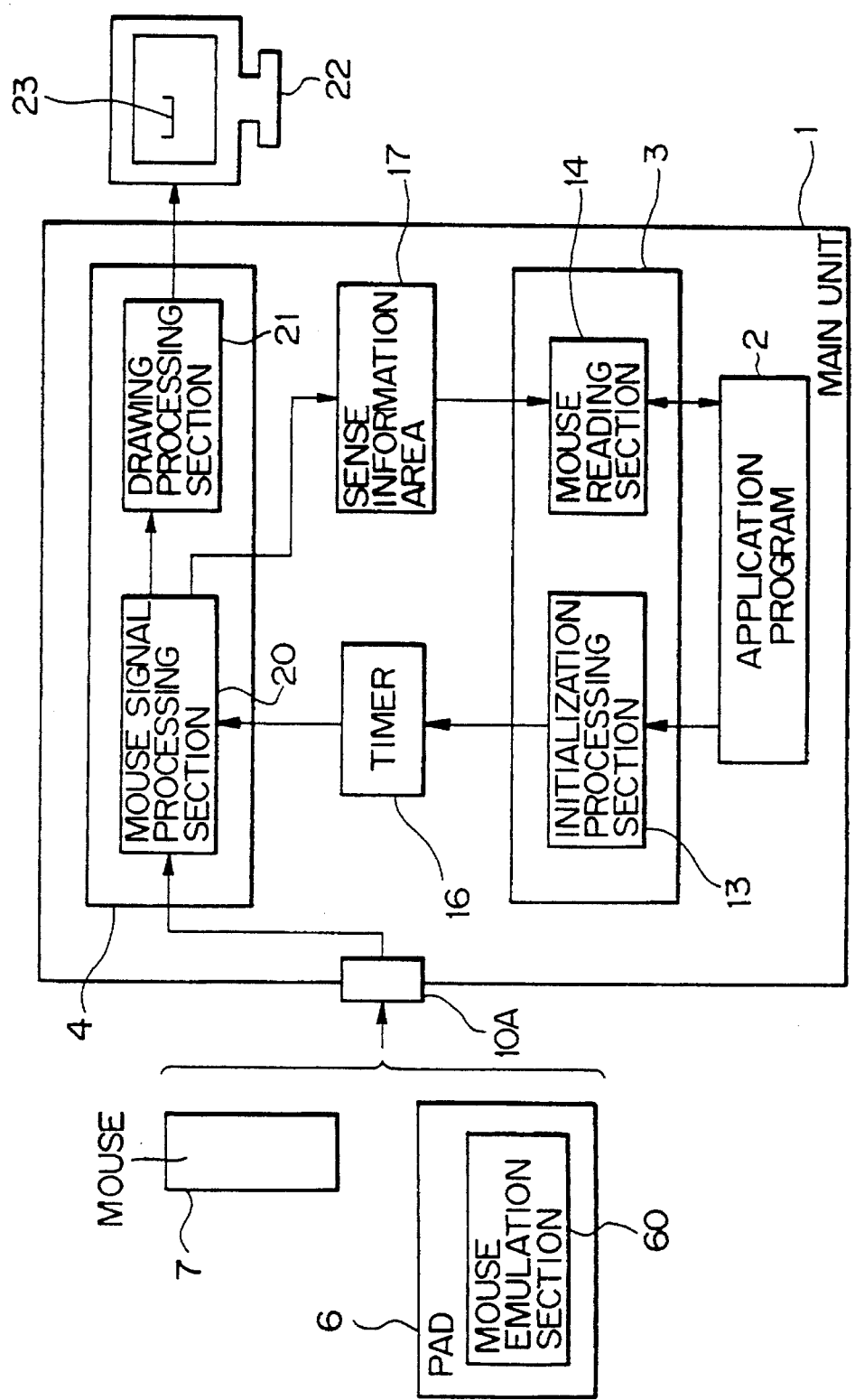
FIG. 14 is a block diagram showing the configuration of a data processing device according to an eighth embodiment of the invention.
Figure 15:
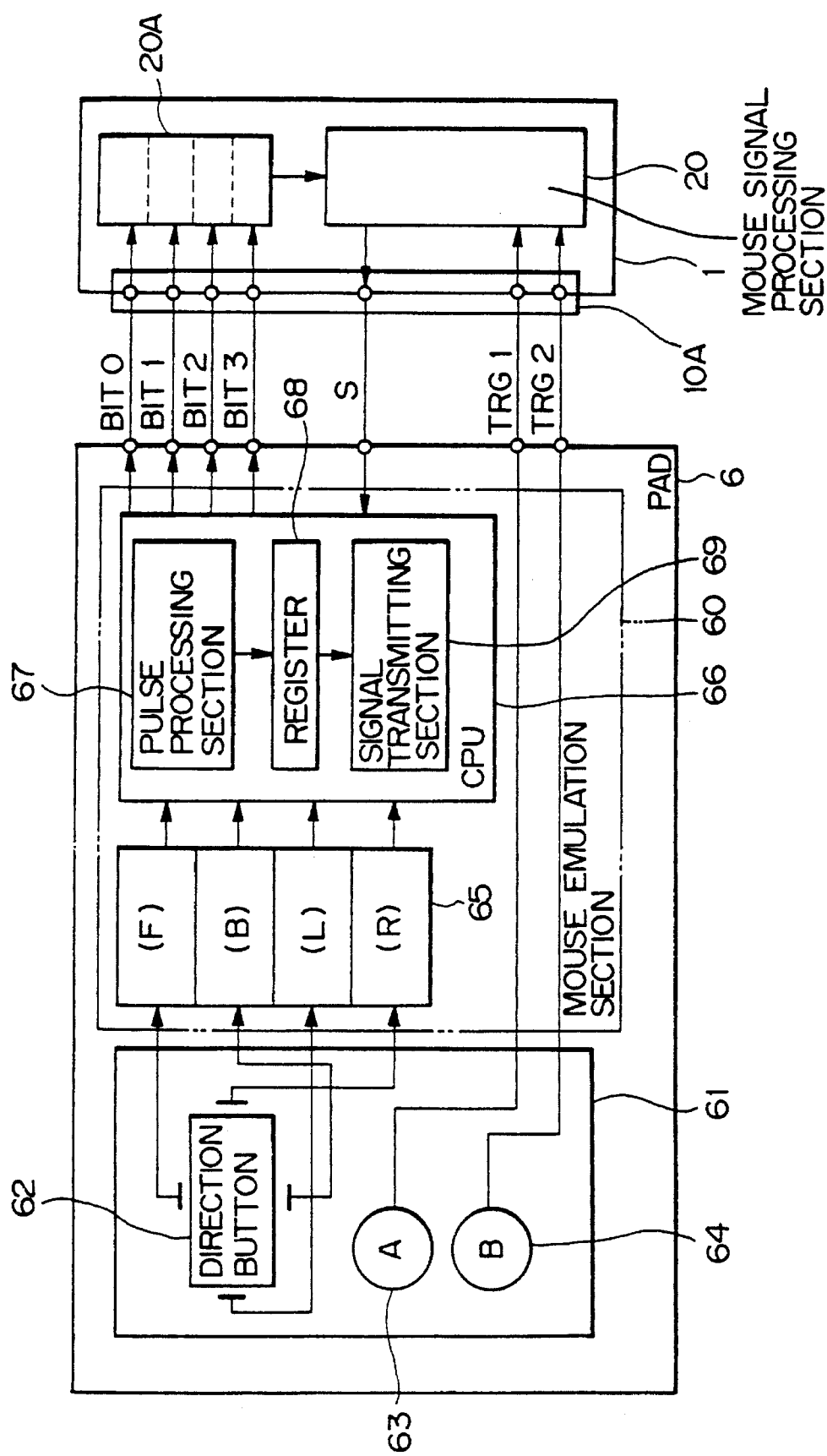
FIG. 15 is a diagram showing the configuration of an operation pad according to the eighth embodiment.

FIGS. 14 and 15 are diagrams showing the configuration of an eighth embodiment. FIG. 14 shows the configuration of the data processing device, and FIG. 15 primarily depicts the configuration of the pad 6.

As shown in FIG. 14, the configuration of the data processing device of the eighth embodiment is similar to that of the data processing device of the first embodiment shown in FIG. 1, a major difference being that in the eighth embodiment, the pad 6 incorporates a mouse emulation section 60 while in the first embodiment, the emulation section is contained in the main unit 1. Since the pad 6 has the mouse emulation section 60 incorporated therein, the pad 6 outputs the same signals as those output from the mouse. The connector 10A on the main unit 1 for connection of the mouse 7 and the pad 6 is really a connector designed for connection of a mouse but, in this embodiment, is used in common for connection of the two types of input device.

The various sections of the main unit 1 shown in FIG. 14 have the same functions as the corresponding sections in the first embodiment, and therefore, explanation of such sections is not given here. Accordingly, only the pad 6 and its associated parts will be described below with reference to FIG. 15.

As described, the pad 6 contains the mouse emulation section 60. The mouse emulation section 60, incorporated in the pad 6 as an integral part thereof, is implemented primarily in hardware and consists of a pulse generating circuit 65 (comprising pulse generating circuits 65F, 65B, 65L and 65R) and a central processing unit (CPU) 66.

Using signals input to the pad 6 by the operator, the mouse emulation section 60 emulates the same processing as performed by the CPU 66, etc., of the mouse 7 previously described, so that the pad 6 outputs the same signals (mouse emulation signals) as the output signals of the mouse 7. Thus the pad 6 appears the same as the mouse 7 to both the main unit 1 and the mouse signal processing section 20.

The pad 6 usually includes a direction button 62, an A button 63, and a B button 64 on an operation surface 61 (the upper surface of the pad 6) that the operator operates. The direction button 62, which contains a lever switch or the like, is used to input the direction of movement as well as the amount of movement, and has the function equivalent to that of the ball 71 of the mouse 7. The A and B buttons 63 and 64 are used to input various timing signals (trigger signals), and have functions equivalent to those of the left and right buttons 72 and 73 of the mouse 7.

As shown, the direction button 62 is constructed from simple contact switches. Therefore, when the direction button 62 is pressed in the upper right direction, for example, a constant-level upward direction signal (F) and rightward direction signal (R) are continuously sent from the direction button 62 while the button is held down.

Using the constant-level signals being output from direction button 62, the pulse generating circuit 65 generates pulse signals which are fed to the CPU 66. The pulse generating circuit 65 is divided into four sections corresponding to the upward direction signal (F), downward direction signal (B), leftward direction signal (L), and rightward direction signal (R), respectively.

Figure 16:
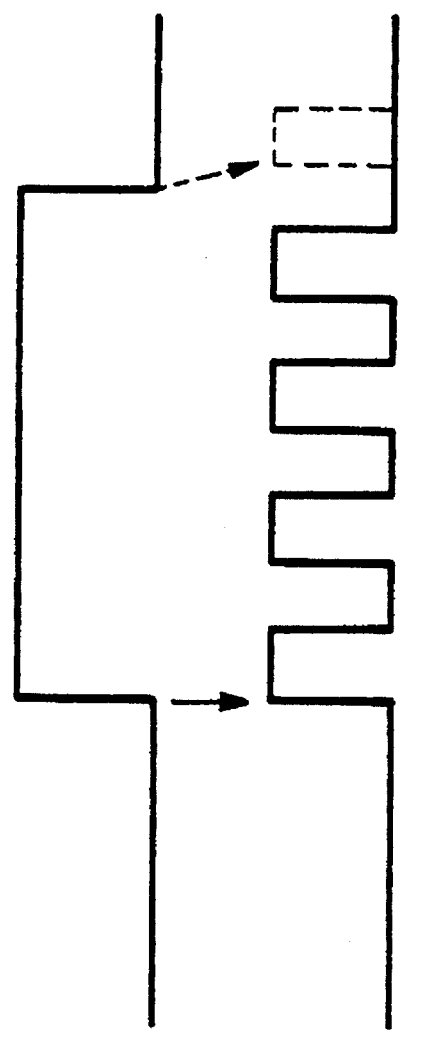
FIG. 16 is a diagram for explaining an operation of a pulse generating circuit shown in FIG. 15.

FIG. 16 is a diagram for explaining the operation of the pulse generating circuit 65F shown in FIG. 15.

For example, when a high level ("H" or "1") upward direction signal F is output from the direction button 62, as shown in FIG. 16, the pulse generating circuit 65F corresponding to the upward direction signal F produces a pulse signal with a prescribed repetition rate during the high level period. The pulse generating circuits 65B, 65L, and 65R corresponding to the other three signals B, L, and R, also operate in the same manner.

When the upward direction signal F goes from low to high in response to the operation of the direction button 62 by the operator, the pulse generating circuit 65F starts pulse transmission in synchronism with the low-to-high transition. When the upward direction signal F goes from high to low, the pulse generating circuit 65F does not send pulses after the high-to-low transition.

The pulse signal that the pulse generating circuit 65F generates is of the same nature as the signal PHASE A that the rotary encoder 75 of the mouse 7 shown in FIG. 2 outputs. That is, this pulse signal specifies an upward movement of the mouse cursor 23 and the amount of the movement. Likewise, the pulse signals output from the pulse generating circuits 65B, 65L, and 65R are respectively of the same nature as the signal PHASE B output from the rotary encoder 75, the signal PHASE A output from the rotary encoder 74, and the signal PHASE B output from the rotary encoder 74.

The pulse generating circuit 65 may be so configured as to increase the number of pulses to generate (shorten the pulse cycle) when the direction button 62 is held down for a sustained period of time. The movement of the mouse cursor 23 can thus be accelerated, as when using a mouse.

For example, when the direction button 62 is held down for more than a predetermined length of time, then the pulse cycle is shortened to one-half, thereby doubling the number of pulses to be transmitted in a unit time, and when the direction button 62 is held down for a further predetermined length of time, the number of pulses to be transmitted is increased to four times the initial number. The moving speed can thus be increased since the amount of movement input from the direction button 62 is designated in terms of the number of pulses.

with this acceleration, the operation feeling of the mouse cursor 23 by the mouse 7 can be emulated even when using the pad 6. Each pulse generating circuit 65F, 65B, 65L, and 65R, has a timer that stores the length of time during which the corresponding signal is being generated, the timer being reset when the corresponding signal goes to a low level ("L" or "0").

The CPU 66 has a pulse processing section 67, a register 68, and a signal transmitting section 69. When the CPU 66 receives a pulse output from the pulse generating circuit 65, the pulse processing section 67 first performs prescribed processing on the pulse output to obtain the amount of movement input from the direction button 62. The amount of movement can be found by counting the number of pulses output from the pulse generating circuit 65.

Then, based on this amount of movement, the pulse processing section 67 obtains the amount corresponding to the amount of movement of the ball 71 of the mouse 7. To achieve this, the amount of the ball 71 corresponding to one pulse output from the pulse generating circuit 65 is set as a conversion parameter. The amount corresponding to the amount of movement of the ball 71 can be found by converting the amount of movement input from the direction button 62 by using the conversion parameter.

The pulse processing section 67 then writes the amount corresponding to the amount of movement of the ball 71 into the designated register 68. The calculation and writing of the amount of movement are performed at predetermined intervals of time independently of the strobe signal S sent from the main unit 1.

When the CPU 66 receives a strobe signal S from the mouse signal processing section 20, the signal transmitting section 69 references the register 68 and reads out the amount corresponding to the amount of movement of the ball 71 held in the register 68 at that instant in time, the amount thus read out then being transmitted to the main unit 1. The transmitted signal and the timing of signal transmission are exactly the same as the signal that would be output from the mouse 7. That is, each signal is transmitted with the timing shown in FIG. 3.

The amount corresponding to the amount of movement of the ball 71, which forms an important portion of the mouse emulation signal, is calculated in the pulse processing section 67 in the following manner.

The number of pulses each of the pulse generating circuits 65F and 65B has generated after the immediately preceding calculation is counted, and the difference between the two (the number of pulses) is obtained. When this difference indicates an upward movement, the amount of movement in the Y direction represented by 8-bit data (Y7–Y0) is given by a positive number. The amount of movement in the Y direction represented by the 8-bit data can be found by converting the number of pulses, i.e., the difference, by using the conversion parameter.

When the above difference indicates a downward movement, the amount of movement in the Y direction is given by a negative number. Also, the amount of movement is expressed in the form of two's complement, which is the same as in the case of the output signal of the mouse 7.

Likewise, the amount of movement in the X direction represented by 8-bit data (X7–X0) is obtained from the difference between the numbers of pulses generated by the pulse generating circuits 65L and 65R.

The amount of movement is expressed as relative coordinates with respect to the position coordinates previously written to the register 68. The pulse processing section 67 holds the previously written position coordinates. For each calculation of the amount of movement, the pulse processing section 67 obtains the relative coordinates with respect to the previously written position coordinates on the basis of the calculated amount of movement and the previously written position coordinates, and writes the relative coordinates into the register 68.

The timing to write data to the register 68 and the timing for the signal transmitting section 69 to read data from the register 68 based on the strobe signal S are appropriately controlled. That is, the timing should be controlled so that the data is read out at least once during the period between the first data write and the next data write to the register 68.

With the above processing, exactly the same signal (mouse emulation signal) as the signal that would be output from the mouse 7 is transmitted from the pad 6 at exactly the same timing to (the register 20A in) the main unit 1. More specifically, the amount corresponding to the amount of movement of the ball 71 is input in the same bit configuration (in nibbles) with the same timing as shown in FIG. 3. Signals from the A and B buttons 63 and 64 corresponding to the left and right buttons 72 and 73 are also input in the same manner.

Therefore, the main unit 1 or the application program 2 need not recognize which input device, the mouse 7 or the pad 6, is connected to the connector 10A. In the main unit 1, the output signals from the pad 6 are processed in exactly the same manner as in the case of the previously described output signals of the mouse 7.

FIG. 17 is a diagram showing a ninth embodiment. FIG. 17 shows a diagram corresponding to FIG. 15. Some portions of the pad 6 shown in FIG. 15 are omitted in FIG. 17.

The pad 6 shown in FIG. 17 differs from the pad 6 shown in FIG. 15 in that, in FIG. 17, the pad 6 has a switch 30 mounted on its case and a selector circuit 31 for switching a signal path for signals from the direction button 62 in accordance with a select input from the switch 30.

In response to the input from the switch 30, the selector circuit 31 switches the signal path either to direct the signal from the direction button 62 to the mouse emulation section 60 or to output the signal directly to an output terminal of the pad 6.

In the former case, the pad 6 outputs a mouse emulation signal. That is, the pad 6 emulates the mouse 7 so that the application program 2 designed for operation through input from the mouse 7 can be run.

In the latter case, the pad 6 outputs a signal as it is output from the direction button 62. Therefore, the pad 6 functions as a pad as it is originally intended, to operate, via the pad input/output control section 26 and the pad basic input/output section 25, the application program 2A designed for operation through input from the pad 6. In this case, the terminal at which the strobe signal S is applied has no meaning.

In this embodiment, the operator knows beforehand whether the application program to be run on the main unit 1 is designed for operation through input from the mouse 7 or the pad 6, and operates the switch 30 accordingly. The operator is thus able to use the pad 6 as a device emulating the mouse 7 or as the original pad 6. More specifically, the pad 6 includes the mouse emulation section 60 constructed from hardware that operates in accordance with a select input applied externally (by the operator). In other words, the pad 6 includes the switch 30 capable of activating emulation (activating the emulation mode).

The pad input/output control section 26 and the pad basic input/output section 25 correspond to the mouse input/output control section 4 and the mouse basic input/output section 3, respectively. These sections may be constructed as an integral unit.

Furthermore, it is possible to construct the mouse emulation section as a detachable circuit so that the pad 6 can be used as a usual pad when the mouse emulation section 60 is not attached, and as a replacement for a mouse when the mouse emulation section 60 is attached. This allows the mouse emulation section 60 to be offered as an option, and the user can purchase the mouse emulation section 60 according to their needs.

The preferred embodiments of the invention have been described above, but it will be appreciated that various modifications can be made without departing from the spirit of the invention. For example, in the seventh embodiment, the mouse emulation section contained in the main unit is implemented in software, but this can be implemented in hardware, as in the eighth and ninth embodiments. The converse is also possible.

We claim:

1. A data processing device in a casing, for receiving an operation pad and running an application program designed for operation by operating data corresponding to mouse signals output from a mouse, said data processing device comprising:

a memory for storing the application program;

a pad connector, attached to the casing for receiving the operation pad and data signals output by the operation pad;

an emulation processing section for processing the pad signals output from the operation pad connected to the pad connector and converting the data signals to the operating data to run the application program designed for operation by the operating data;

a mouse connector, attached to the casing, for receiving the mouse;

a mouse signal processing section for processing the mouse signals output from the mouse connected to the mouse connector and, in response, generating the operating data for use by the application program;

a selecting section for selecting the operating data for use by the application program from the mouse signal processing section or the emulation processing section;

an emulation activation judging section for determining connection states of the mouse and the operation pad when called by the application program and, in response, determining whether to activate or not activate the emulation processing section; and an emulation flag area in which a flag is set or cleared according to the determination of the emulation activation judging section, wherein the selecting section tests the flag in the emulation flag area and generates the operating data for use by the application program from the mouse signal processing section or the emulation processing section.

2. A data processing device according to claim 1, wherein the emulation activation judging section comprises:

detecting means for detecting whether the mouse is connected to the connector, and sets or clears the flag in the emulation flag area so that when the mouse is connected, the operating data for use by the application program is generated from the mouse signals of the mouse, and when the mouse is not connected, the operating data for use by the application program is generated from the data signals.

3. A data processing device according to claim 1, wherein the emulation activation judging section comprises:

pad detecting means for detecting whether the operation pad is connected to the pad connector, and sets or clears the flag in the emulation flag area so that when the operation pad is connected, the operating data for use by the application program is generated from the data signals, and when the operation pad is not connected, the operating data for use by the application program is generated from the mouse signals.

4. A data processing device according to claim 1, wherein the emulation activation judging section comprises:

mouse detecting means for detecting whether the mouse is connected to the mouse connector;

pad detecting means for detecting whether the operation pad is connected to the pad connector; and the emulation activation judging section sets or clears the flag in the emulation flag area so that when only the mouse is connected, the operating data for use by the application program is generated from the output signal of the mouse signals, when only the operation pad is connected, the operating data for use on the application program is generated from the data signals and when both the mouse and the operation pad are connected, the operating data for use by the application program is generated from the mouse signals.

5. A data processing device according to claim 1, wherein:

the mouse connector and the pad connector are built as a single common connector to allow connection of both the mouse and the operation pad, and the data processing device further comprises:

a selector switch used to indicate which one of the mouse and the operation pad is connected to the single common connector; and the emulation activation judging section sets or unsets the flag in the emulation flag area by detecting a status of the selector switch.

* * * * *

UNITED STATES PATENT AND TRADEMARK OFFICE
CERTIFICATE OF CORRECTION

PATENT NO. : 5,550,562
DATED : August 27, 1996
INVENTOR(S) : Aoki et al.

It is certified that error appears in the above-indentified patent and that said Letters Patent is hereby corrected as shown below:

On the title page, under item [56],

In Other Publications, line 1, change "Maruyamia" to --Maruyama--.

| | |
|---|---|
| Column 4, | line 34, delete "of". |
| Column 5, | line 2, change ";" to --.--. |
| Column 7, | line 11, delete "of"; |
| | line 40, delete "b"; |
| | line 45, change "#rom" to --from--. |
| Column 8, | line 50, delete "10". |
| Column 14, | line 33, delete "10". |
| Column 17, | line 25, change "with" to --With--. |
| Column 20, | line 18, change "detecting means for detecting" to --mouse detecting means for detecting--; |
| | line 19, change "to the connector" to --to the mouse connector--. |

Signed and Sealed this

Seventh Day of January, 1997

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO.   : 5,550,562
DATED        : August 27, 1996
INVENTOR(S)  : Yoichi AOKI et al.

It is certified that error appears in the above-indentified patent and that said Letters Patent is hereby corrected as shown below:

Title page, item [63]
    Change "Continuation-in-part of Ser. No. 113,809, Aug. 31, 1993, abandoned" to --Continuation of Ser. No. 113,809, Aug. 31, 1993, abandoned--.

Signed and Sealed this

Eighth Day of April, 1997

Attest:

BRUCE LEHMAN

Attesting Officer                Commissioner of Patents and Trademarks